United States Patent [19]
Moro

[11] Patent Number: 5,812,879
[45] Date of Patent: Sep. 22, 1998

[54] EXTERNAL MULTIPLE PERIPHERAL INTERFACE TO COMPUTER SERIAL PORT USING INDIVIDUALLY CONFIGURED PARALLEL PORT TERMINALS

[76] Inventor: Ricardo J. Moro, ITC Microcomponents, Inc., 18440-57th Ave., Edmonton Alberta, Canada, T6M 1Y2

[21] Appl. No.: 49,174

[22] Filed: Apr. 19, 1993

[51] Int. Cl.[6] ............................................. G06F 13/00
[52] U.S. Cl. ........................ 395/882; 395/891; 395/892
[58] Field of Search ................................. 395/250, 500, 395/882, 891, 892; 318/696, 685; 371/22.2

[56] References Cited

U.S. PATENT DOCUMENTS

| | | | |
|---|---|---|---|
| 4,079,452 | 3/1978 | Larson et al. | 395/275 |
| 4,084,122 | 4/1978 | Gettings | 318/696 |
| 4,107,593 | 8/1978 | Anderson | 318/685 |
| 4,362,988 | 12/1982 | Weimer | 324/62 |
| 4,496,892 | 1/1985 | Bugatto, Jr. | 318/696 |
| 4,718,042 | 1/1988 | Moll et al. | 371/22.2 |
| 4,864,513 | 9/1989 | Levine et al. | 364/482 |
| 4,922,363 | 5/1990 | Long et al. | 361/3 |
| 5,005,151 | 4/1991 | Kurkowski | 395/775 |
| 5,214,760 | 5/1993 | Hammond et al. | 395/250 |
| 5,276,443 | 1/1994 | Gates et al. | 340/825.06 |
| 5,299,314 | 3/1994 | Gates | 395/200 |
| 5,414,712 | 5/1995 | Kaplan et al. | 371/15.1 |

*Primary Examiner*—Thomas C. Lee
*Assistant Examiner*—Dus Chen
*Attorney, Agent, or Firm*—Litman, McMahon and Brown, L.L.C.

[57] ABSTRACT

A multiple peripheral interface to a computer serial port includes a microcontroller with an adapter serial port for coupling to a standard serial port of a common type of host computer or terminal, a plurality of peripheral ports having read/write configurable data lines for coupling to devices of a process, and a central processing unit interfaced between the adapter serial port and the peripheral ports and executing an adapter operating program to translate simple letter commands and numeric values received from the host computer to port configuration commands, port read commands, and port commands and to translate data read from the peripheral ports to numeric values for transmission back to the host computer.

8 Claims, 18 Drawing Sheets

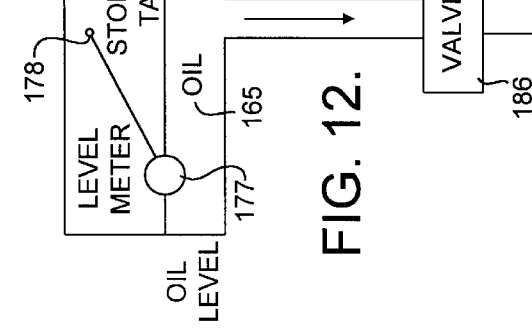
FIG. 12.
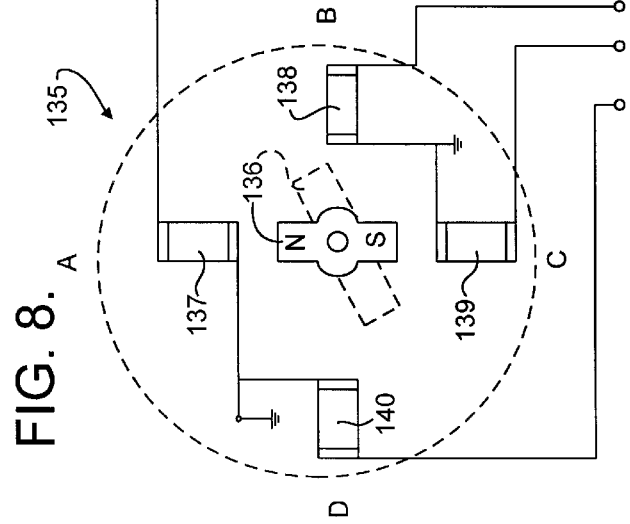
FIG. 8.
FIG. 11.
FIG. 10.
FIG. 9.

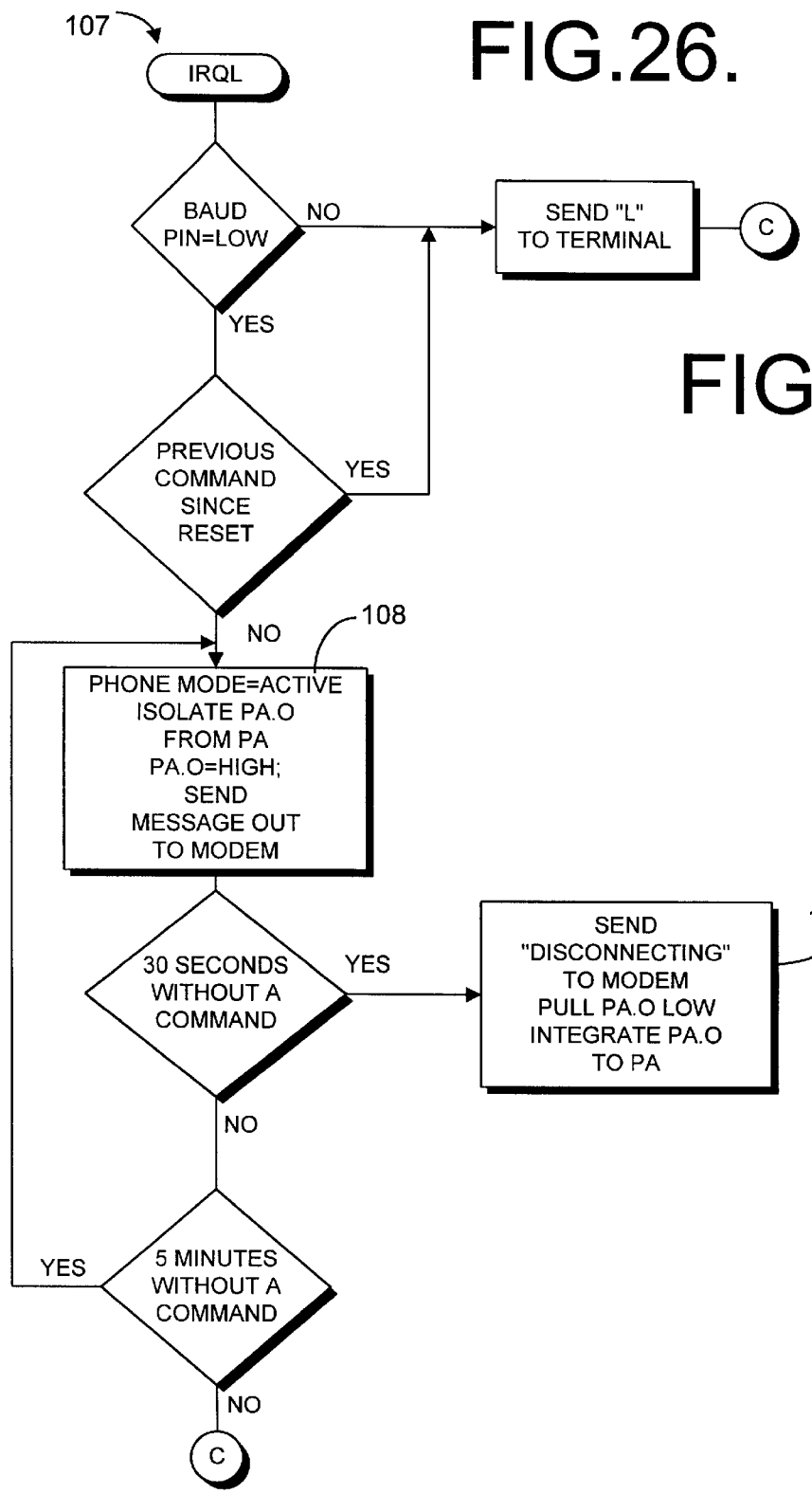
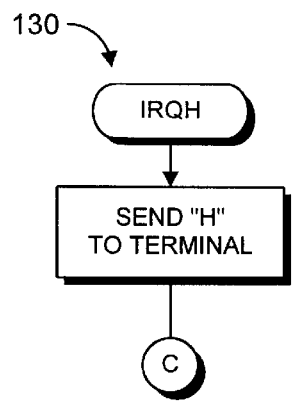
FIG.26.
FIG.27.

EXTERNAL MULTIPLE PERIPHERAL INTERFACE TO COMPUTER SERIAL PORT USING INDIVIDUALLY CONFIGURED PARALLEL PORT TERMINALS

BACKGROUND OF THE INVENTION

Digital computers are used not only for processing pure data but also for controlling and monitoring physical processes. While it is possible to specially design a computer for a particular process, the efforts to create such a special design are usually economically justifiable only if the process has special requirements such as a high degree of reliability, speed, ruggedness, compactness, or the like or if the computer is to be manufactured, as for the market. The great majority of processes such as design prototyping, educational experiments, hobby projects, and the like can be controlled and monitored with adequate degrees of reliability and speed by mass produced and, thus, very economical personal computers. Such computers are suitable for these types of process control applications in terms of computing power, mass storage, user interface, and existing software such as operating systems, programming languages, some application programs, and the like.

The principal problem which arises in using personal type computers to control and monitor processes is interfacing the process to the computer. The functions to be controlled may include the closure of switches or the application of analog levels to devices through digital to analog converters (DACs) in response to a timed schedule or in response to monitored functions such as the detection of switch closures in the process, the measurement of resistances, or the measurement of analog levels through analog to digital converters (ADCs). Additionally, it might be desirable to apply a pulse train or other type of signal to a process or to detect such a signal therefrom.

There are a number of devices available for digital interfacing which are packaged as integrated circuits or chips. Such chips are known by names such as peripheral interface adapters or parallel interface adapters (PIA's), parallel input/output chips (PIO's), and the like. These chips are intended primarily for interfacing between the central processing unit (CPU) of a computer and external devices. Parallel interface adapters generally have a plurality of eight bit parallel ports, the terminals or data lines of which can be individually configured as either input (read) lines or output (write) lines through a data direction register associated with the port. Reads from and writes to a port are made eight bits at a time, hence the description as a parallel port, although individual lines can be accessed by proper masking of the unwanted bits.

Port address decoding logic chips are required to enable the CPU to address the interface chip. Such interface chips are designed to be controlled and accessed using machine language. On a conventional personal computer, access to the CPU is generally accomplished by interfacing to the computer bus by way of a board received in a bus slot connector. Standard operating systems, as for personal computers, generally provide for access to standard I/O (input/output) ports such as video ports, disk ports, standard serial or "COM" ports, and parallel printer ports, but do not have built-in provisions for accessing user added ports. Adding a nonstandard I/O port to a conventional personal computer requires dealing with address decoding which does not conflict with existing I/O ports, the computer bus standards, and the architecture of the CPU and the interface adapter, and requires a custom written program to access the added port as well as to monitor and control the process in machine language. Such a task is often more difficult and time consuming than developing the process to be controlled and monitored.

The standard parallel port on conventional personal computers is intended primarily as a printer port for interfacing to a dot matrix or laser printer using the Centronics protocol. As such, it is normally operated in a data write-only mode to send character and control codes to a printer. However, the interface does have a data read capability which has been exploited in some products, such as a few nonstandard types of tape backup systems. Although the standard personal computer parallel interface is capable of high speed bidirectional transfer of data, it is not designed for configuring the individual lines of the data port as either input or output lines, as is desirable in most process control applications and is limited to only eight bits. Additionally, there is not known to be any standard software available for both writing to and reading from such a parallel port. Thus, the standard parallel port of personal computers has very limited capability as an interface to control and monitor a process.

The standard serial port on conventional personal computers is either a full or partial implementation of the RS-232 serial interface. As such, the standard serial port has a single read or input line and a single write or output line and would have very limited use, by itself, to control or monitor a process. On the other hand, there are a number of commercial, shareware, and public domain programs available for accessing the serial port, in the form of modem communication programs. Such programs function in cooperation with the standard operating system, such as MS-DOS (Microsoft), to facilitate the transmission of data from a disk file, the storage of incoming data in a disk file, the echoing of outgoing and incoming data on the screen, and the capability of sending characters entered on the keyboard directly to the serial port. In the standard types of modem communication programs, alphanumeric and control characters are encoded in ASCII (American Standard Code for Information Interchange).

The use of the standard serial port on a personal computer to control and monitor a process would be considerably more convenient than custom designing an interface based on available peripheral interface adapters. However, the standard serial port by itself is not suitable for such purposes because of the very limited port communication channels and the difficulties that would arise from attempting to directly control a process using ASCII characters and interpret data input to the computer, which the computer would attempt to interpret as ASCII characters if the bit patterns correspond to existing ASCII characters. At present, there is not known to be available a suitable peripheral interface adapter which can be operated through the serial port of a conventional personal computer and which communicates therewith in ASCII encoded characters.

SUMMARY OF THE INVENTION

The present invention provides a parallel peripheral interface adapter to facilitate communication between devices of a process and a host computer or computer terminal having a standard RS-232 serial port to control and monitor the process by the computer or terminal. The adapter is essentially a microcontroller chip having a serial interface to communicate with the serial port of the computer, a plurality of parallel peripheral interfaces to communicate with the devices of the process, a central processing unit (CPU), read-only memory (ROM), read/write memory (RAM), and a clock. The microcontroller has an operating program stored in ROM which translates selected ASCII characters received from the host over the serial interface into machine language commands and data to configure the peripheral ports and to write data thereto. The program also translates binary data read from the peripheral ports to ASCII encoded equivalent characters which are sent to the host along with ASCII encoded status messages by way of the serial interface therebetween.

A preferred embodiment of the adapter of the present invention provides three eight-bit parallel ports, the individual lines or terminals of which can be configured as read (input) or write (output) lines. The adapter is programmed so that the higher four bits of each of these ports can be used to control the operation of a stepper motor. A four bit read-only port shares terminals with a synchronous serial interface which can be used to interface the adapter with other synchronous serial devices, such as some analog to digital (A/D) converters and digital to analog (D/A) converters. The adapter also includes a square wave signal generator which can be activated to output a signal which is user controllable in frequency and which can be pulse width modulated (PWM) for a user selected duty cycle. Such a signal can be used to generate an analog voltage or to control the speed of a DC motor.

On one of the eight bit ports, internal program support is provided for using each of the lower four bits to measure the relative resistance of a resistive element or the relative capacitance of a capacitive element without the use of a conventional analog to digital converter. This is accomplished by connecting the resistive element in series with a known capacitance or the capacitive element in series with a known resistance across a voltage to form an RC (resistive-capacitive) circuit. The program controls the discharging and then charging of the capacitor through the resistor while measuring the charging time or RC time constant. From this and the value of the known element, the relative value of the unknown resistor or capacitor can be determined.

The program is capable of allowing the user to communicate manually with the process from the keyboard and screen of the host computer using combinations of simple letter commands and number values. The adapter can be configured to operate using decimal, hexadecimal, or binary numbers, as is most convenient. The adapter can also be configured to enable control and monitoring of the process by a process control program running on the host computer which automatically exports commands and data and imports data and status messages.

OBJECTS AND ADVANTAGES OF THE INVENTION

The principal objects of the present invention are: to provide a more versatile interface adapter for interfacing between a process and a personal type computer; to provide, particularly, a parallel peripheral interface adapter for controlling and monitoring a process from a personal computer by way of the standard serial port of such a computer or a computer terminal having an RS-232 serial port; to provide such an adapter which includes a serial interface for connection to the serial port of the computer and a plurality of parallel peripheral ports having port or peripheral lines which can be selectively configured as either read (input) lines or write (output) lines for connection to devices of a process to control and monitor same; to provide such an adapter which can be interfaced to the serial port of the computer by way of modems at each end over a telephone line for remote control and monitoring of the process; to provide such an adapter which preferably includes a synchronous serial interface for communicating with other synchronous serial devices and a square wave generator which is user controllable in frequency over a range and in duty cycle by pulse width modulation; to provide such an adapter which translates simple, ASCII encoded commands received from the host computer to machine language and binary data to configure the ports and to write data thereto and which translates binary data and status reports to ASCII encoded values and messages which are sent back to the host computer; to provide such an adapter in which the program enables the user to operate the adapter to control and monitor the process using decimal, hexadecimal, or binary numbers; to provide such an adapter in which the control program has a configuration which enables the process to be automatically controlled and monitored by a process control program running in the host computer; to provide such an adapter wherein the control program enables the process to be controlled manually by a user by way of the keyboard and screen of the host computer; to provide such an adapter which is conveniently operable to control and monitor a process using common, commercially available modems and communication type programs; to provide such an adapter wherein the control program preferably has routines and tables therein for controlling stepper motors of various configurations; to provide such an adapter wherein the control program preferably has provisions for measuring relative resistances and capacitances connected to selected peripheral lines of the adapter without the use of an analog to digital converter; to provide such an adapter which facilitates the control of peripheral processes using personal computers without requiring a detailed knowledge of the operating system of the host computer or of the logic design and control of the serial port or adapter device; to provide such an adapter which can be used with virtually any type of personal computer or terminal having a standard RS-232 serial port; to provide such an adapter which can be implemented as a programmed microcontroller chip; and to provide such a multiple peripheral interface adapter for the serial port of a personal type computer which is economical to manufacture, which is versatile in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 8 is a simplified diagram illustrating a stepper motor for which the operating program of the interface adapter of the present invention has control routines and tables, with a rotor half step position shown in phantom.

FIG. 9 is a table illustrating exemplary control bit patterns for monophasic control of the stepper motor of FIG. 8 using the interface adapter.

FIG. 10 is a table illustrating control bit patterns for biphasic control of the stepper motor of FIG. 8 using the interface adapter.

FIG. 11 is a table illustrating control bit patterns for half step control of the stepper motor of FIG. 8 using the interface adapter.

FIG. 12 is a diagram illustrating the principal components of an exemplary oil pumping process which the interface adapter of the present invention is suitable for controlling and monitoring.

FIG. 26 is a flow chart illustrating a logic low interrupt (IRQL) routine of the operating program.

FIG. 27 is a flow chart illustrating a logic high interrupt (IRQH) routine of the operating program.

DETAILED DESCRIPTION OF THE INVENTION

Figure 1:
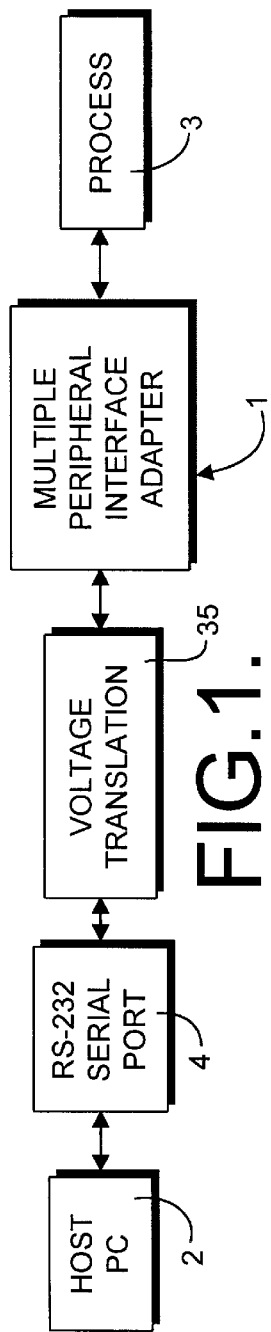
FIG. 1 is a simplified block diagram of a multiple peripheral interface adapter embodying the present invention which provides interfacing between a host computer and a peripheral process through a serial port of the host computer.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a multiple peripheral interface adapter embodying the present invention. In general, the adapter 1 is used to provide an interface between a terminal or host computer 2 and a plurality of devices of a process 3 by way of the serial port 4 of the host computer 2 for control and monitoring of the process 3 by the host computer 2.

The term "host computer" or "computer" is used herein to designate the device 2 which communicates with the process 3 by way of the adapter 1. The term "computer" as used herein is primarily intended to encompass personal type computers such as so-called IBM (International Business Machines Corporation) compatible or MS-DOS (Microsoft Corporation) compatible computers, Macintosh (Apple Computer, Inc.) computers, or the like which are equipped with industry standard RS-232 serial ports. Additionally, the term "computer" or "computer means" is intended to encompass computer terminals which have standard RS-232 ports. Alternatively, computer devices having serial ports adhering to other standards may be employed with the adapter 1 of the present invention or may, in some cases, be modified or programmed for use therewith. Additionally, computer devices with other types of not strictly serial I/O (input/output) ports may be modified and/or programmed for suitable use with the adapter 1. Such alternative devices are also intended to be encompassed by the term "computer", "host computer", or "computer means" if they can perform the functions of the host computer 2 of the present invention as described below.

Figure 13:
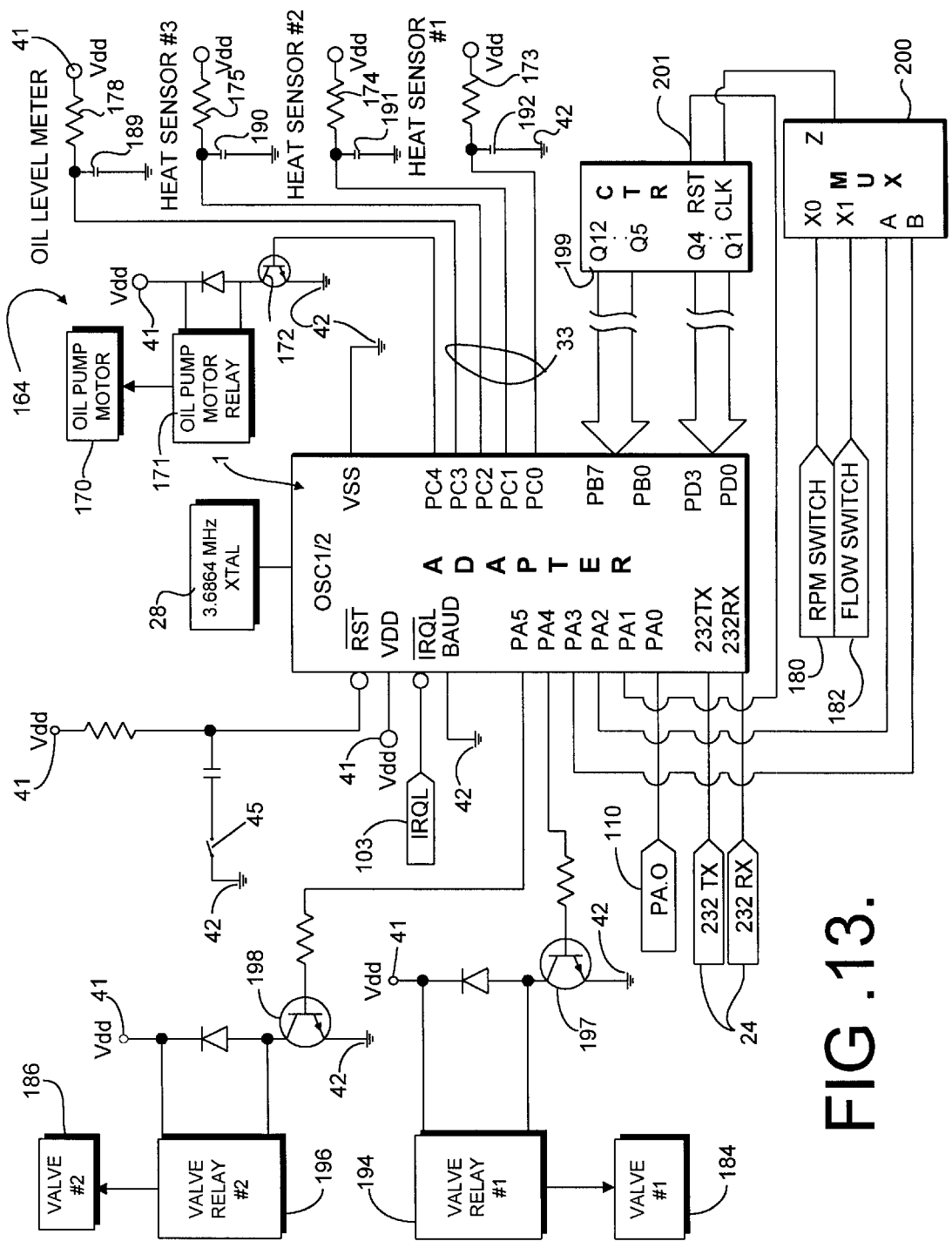
FIG. 13 is a circuit diagram illustrating the interface adapter and supporting circuitry for controlling and monitoring the oil pumping process illustrated in FIG. 12.

The term "process" is used herein to generically describe a subsystem which is to be controlled or monitored by the host computer 2 through the adapter 1. The process 2 may be any of a number of systems such as an educational experiment, a development prototype, a hobby project, a manufacturing process, machinery, an alarm system, or the like wherein a number of functions having some sort of intercoordination are to be controlled and/or monitored. An exemplary oil pumping process 6 which is controlled by a host computer 2 by way of the adapter 1 is illustrated in FIGS. 12 and 13 and is described in detail hereinbelow.

Figure 2:
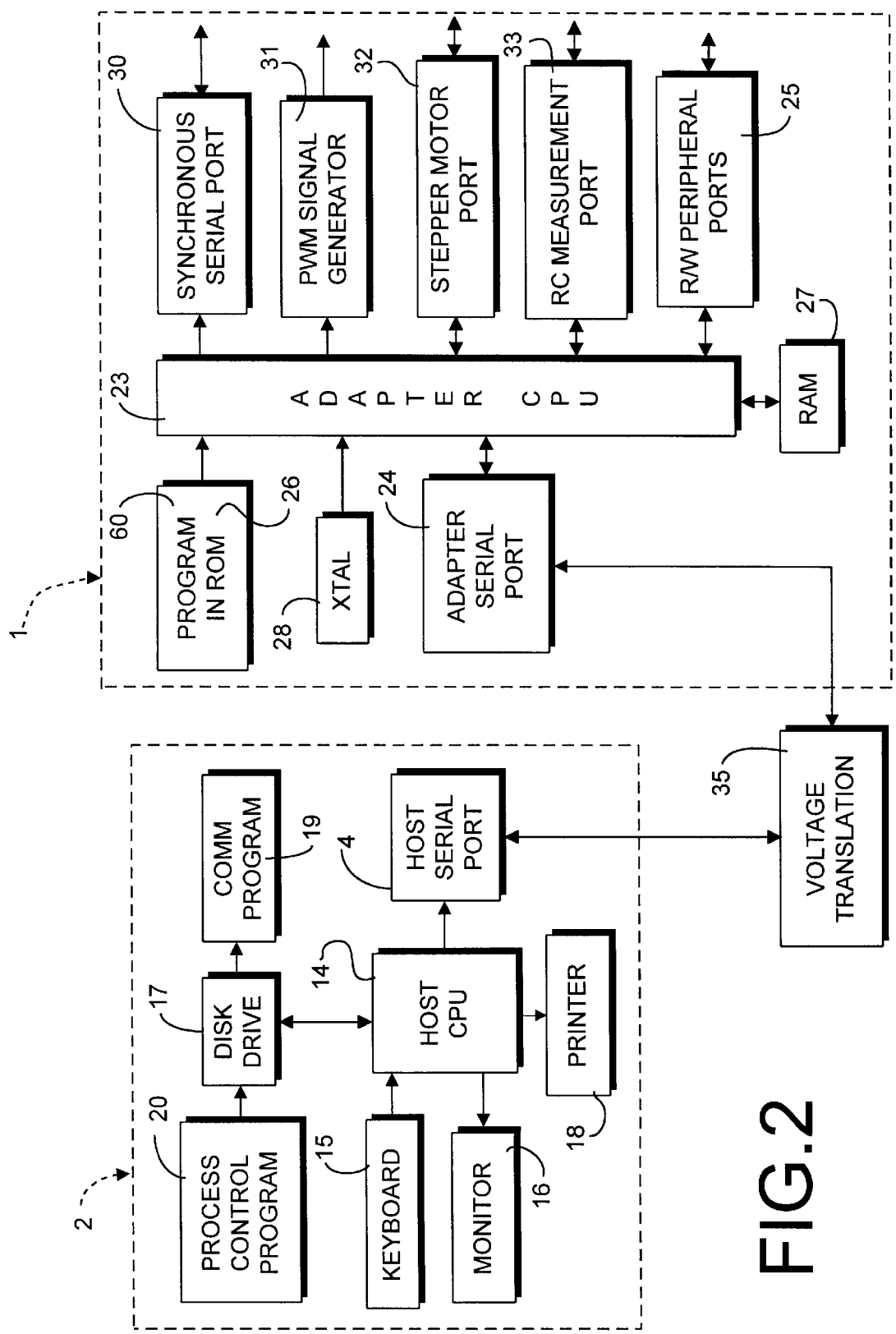
FIG. 2 is a block diagram illustrating details of the host computer and the interface adapter according to the present invention.

Referring to FIG. 2, the illustrated host computer 2 includes a host central processing unit (CPU) 14 to which are interfaced a keyboard 15 and a monitor or screen 16, a disk drive 17 which may include a floppy disk drive and a hard disk drive, a printer 18, and the host serial port 4. The CPU 14 operates under the control of operating system software (not shown) which is stored on the disk 17 and in cooperation with which application programs, such as a communication (Comm) program 19 and the like which are also stored on the disk 17. The disk 17 may also store a process control program 20 which is executed to control and monitor the process 3.

FIG. 2 illustrates functional components of the adapter 1. The adapter 1 includes at least an adapter CPU 23, an adapter serial port or interface 24, configurable peripheral ports 25, a read-only memory (ROM) 26 storing an operating program for the adapter 1, read/write memory (RAM)

27, and a time base standard such as a crystal (XTAL) 28. The illustrated adapter 1 also includes a synchronous serial port 30, a square wave signal generator 31 having pulse width modulation and user frequency control capabilities, stepper motor control ports 32, and resistance-capacitance (RC) time constant measurement ports 33. In the preferred embodiment of the adapter 1, the stepper motor and RC measurement ports 32 and 33 are implemented as special configurations of portions of the peripheral ports 25. Alternatively, the adapter 1 may include other functional circuitry and control circuitry (not shown) such as an analog to digital converter, a digital to analog converter, phase locked loop logic for frequency synthesis, internal signal generators, timers, counters, and the like.

In order to connect the adapter 1 to directly the host computer 2, voltage translation circuitry 35 is required to accommodate the standard 12 volt levels of the host serial port 4 with the 5 volt levels of the serial port 24 of the adapter 1. Alternatively, isolation, as provided by optocouplers (not shown), might be required or desirable in connecting the adapter 1 to the host computer 2.

Figure 3:
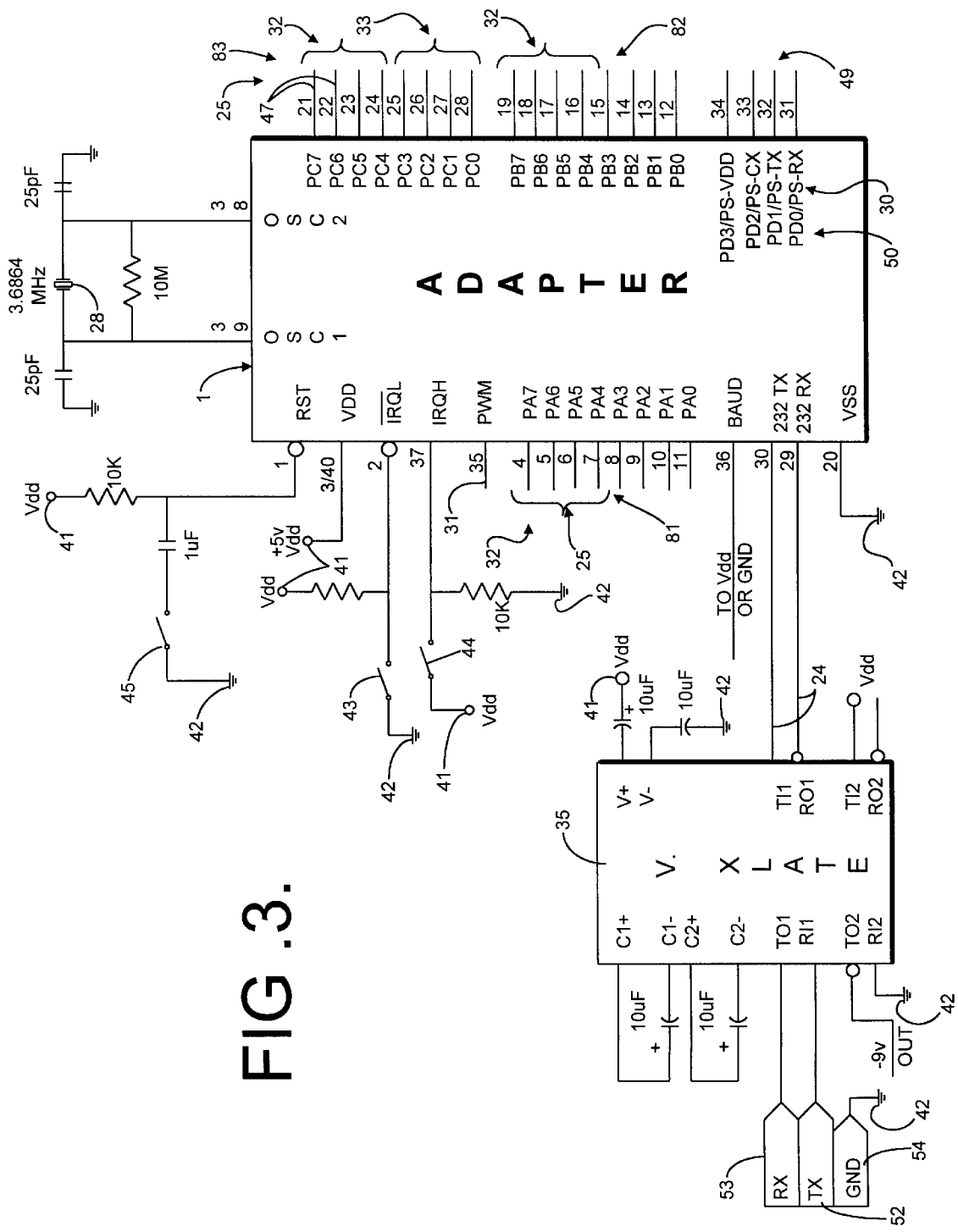
FIG. 3 is a circuit diagram illustrating a preferred embodiment of the interface adapter of the present invention and a voltage translation chip for interfacing to the host computer.

FIG. 3 illustrates a preferred embodiment of the interface adapter 1 and an exemplary voltage translation (V. XLATE) circuit or chip 35. The adapter 1 may be implemented as a circuit card (not shown) with individual chips for a CPU, a serial interface, a parallel peripheral interface, ROM, RAM, and other functional circuitry. However, the interface adapter 1 is preferably embodied as a programmed microcontroller, also known as a single chip microcomputer. A preferred microcontroller for use as the interface adapter 1 is the Motorola 68HC05C8 which is a member of the 6805 sub-family of the 6800 series of microprocessors. Other microprocessors with supporting circuitry and microcontrollers could also be employed as the interface adapter 1; therefore, the present invention is not intended to be limited to any particular microcontroller or microprocessor.

The illustrated adapter 1 is powered by connection of VDD and VSS terminals across a DC power supply (not shown) with five volts from the power supply positive terminal 41 on VDD and zero volts from the power supply negative terminal or ground 42 on VSS. A master clock (not shown) within the adapter 1 is referenced to the crystal 28 which is connected to terminals OSC1 and OSC2. The adapter 1 is preferably operated at 3.6864 Mhz. A BAUD terminal provides a hardware setting for the Baud rate of the serial port 25 at 9600 Bauds if set high or 300 Bauds if set low. A high or low interrupt can be asserted respectively on the IRQH or IRQL terminals. High and low interrupt switches 43 and 44 respectively are illustrated and may be contacts of relays (not shown) or other switching devices within the process 3 which change state to indicate a critical condition within the process 3 which requires prompt service from the adapter 1 or the host computer 2. The adapter 1 is reset by assertion of a low on the RST terminal. A reset switch 45 may be provided for manual reset of the adapter 1. The adapter serial port 24 is accessible on terminals labeled 232TX and 232RX. The signal generator 31 has an output on the PWM terminal.

The read/write peripheral ports 25 are implemented on the preferred adapter 1 shown in FIG. 3 as three eight-bit ports which are designated port A consisting of peripheral lines PA0–PA7, port B consisting of peripheral lines PB0–PB7, and port C consisting of peripheral lines PC0–PC7. The peripheral lines 47 of each of the ports 25 are all initially configured as inputs at power-up or after a reset, and can be individually configured as read (input) lines or write (output) lines by writing a binary configuration byte to a data direction register (not shown) associated with the port 25, in which a logic zero causes the associated line to remain an input line or a logic one configures the line as an output line. The synchronous serial interface 30 shares terminals with a read-only port designated as port D and consisting of peripheral lines PD0–PD3. Whether the combined port 49 operates as port D 50 or synchronous serial interface 30 depends on the configuration thereof. When configured as the synchronous serial interface 30, the port lines are designated as PS_RX, PS_TX, PS_CX, and PS_VDD. Additional information regarding the available features and operating characteristics of the microcontroller employed as the adapter 1 can be obtained from the manufacturer and, with regard to the preferred microcontroller, can be obtained from Motorola or distributors of Motorola products regarding the 68HC05C8.

The voltage translation circuit 35 is also referred to as a serial port driver and may be a chip such as the MAX232 (Maxxim). Its purpose is to convert the five volt serial signal from the adapter serial port 24 to a twelve volt signal for connection to the host serial port 4 and to convert the twelve volt serial signal from the host serial port 4 to a five volt signal for connection to the adapter serial port 24. Such voltage translation simplifies the supply of power to the adapter 1. Alternatively, other serial port drivers could be employed if the required voltages are available from the power supply (not shown) of the adapter 1 or process 3. A serial signal transmitted from the adapter serial port 24 is available on a transmit terminal 52 of the voltage translator 35 and is marked TX. The serial signal from the host serial port 4 is applied to a receive terminal (RX) 53 of the chip 35. The serial signals on the terminals 52 and 53 are referenced to a signal ground 54 which is connected to the power supply ground 42 of the adapter 1. The translation of voltages between the host 2 and the adapter 1 can also be accomplished by means such as optocouplers (not shown) which would also provide increased DC isolation between the host 2 and the process 3.

In general, the adapter 1 controls the operation of and communication through the ports 24, 25, and 30–33 by the execution of machine language commands of the operating program 60 stored in the ROM 26 which are addressed to the particular ports to configure same, write thereto, or read therefrom. While the programming of the microcontroller employed as the adapter 1 is not especially difficult for an experienced assembly or machine language programmer, it is, on the other hand, tedious and requires a detailed knowledge of the CPU and port architectures, the addressing modes of the chip, and the peculiarities of the native machine language of the particular microcontroller or microprocessor employed as the adapter 1. In order to achieve one of the primary objects of the present invention, namely to facilitate interfacing a process 3 to a host computer 2, the present invention provides the program 60 for the adapter 1 which enables a user to control and monitor the process 3 through the adapter 1 using simple letter commands, some having numeric arguments. Regarding the actual interfacing, some knowledge of the electrical and accuracy limitations of the microcontroller functioning as the adapter 1 is necessary.

The adapter 1 is programmed to translate selected ASCII coded letter commands received from the host computer 2 to actions within the adapter 1 and to translate data read from the peripheral ports and status reports and the like to ASCII equivalent messages for transmission to the host computer 2. ASCII commands for the adapter 1 and the process 3 can be generated in the host computer 2 by a communication program 19 such as Procomm Plus (Data Storm), Smartcom (Hayes), Bitcom (Bit Software) or the like; by operating systems to copy input characters to the serial port 4; by a custom written program for communication with the adapter 1; or by the process control program 20. The incoming commands from the host computer 2 are generally parsed character by character, and actions are taken by the program 60 depending on the content of the received command.

Figure 14:
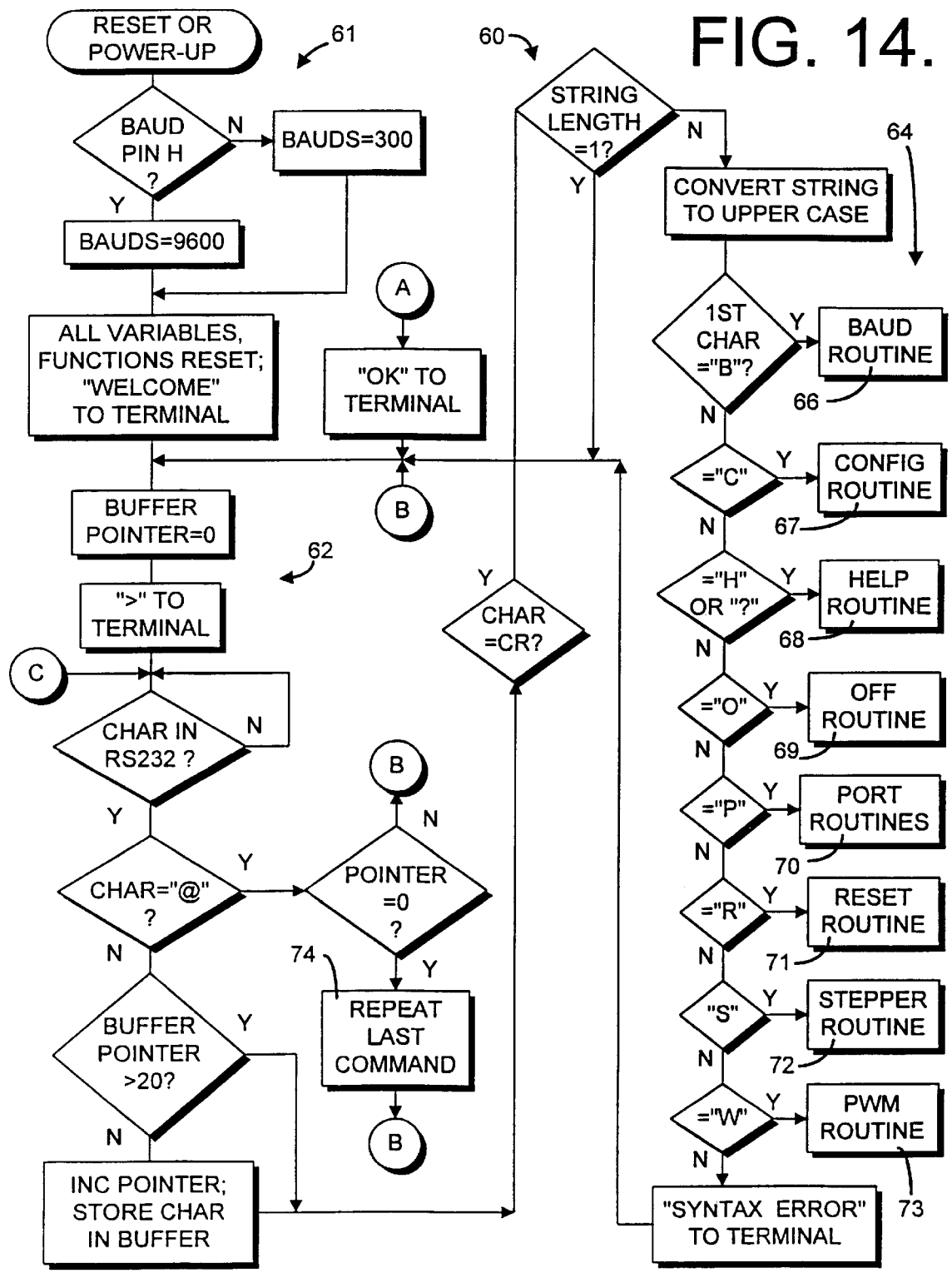
FIG. 14 is a flow chart illustrating a reset or power routine and a main loop of an exemplary operating program for the interface adapter according to the present invention.
Figure 15:
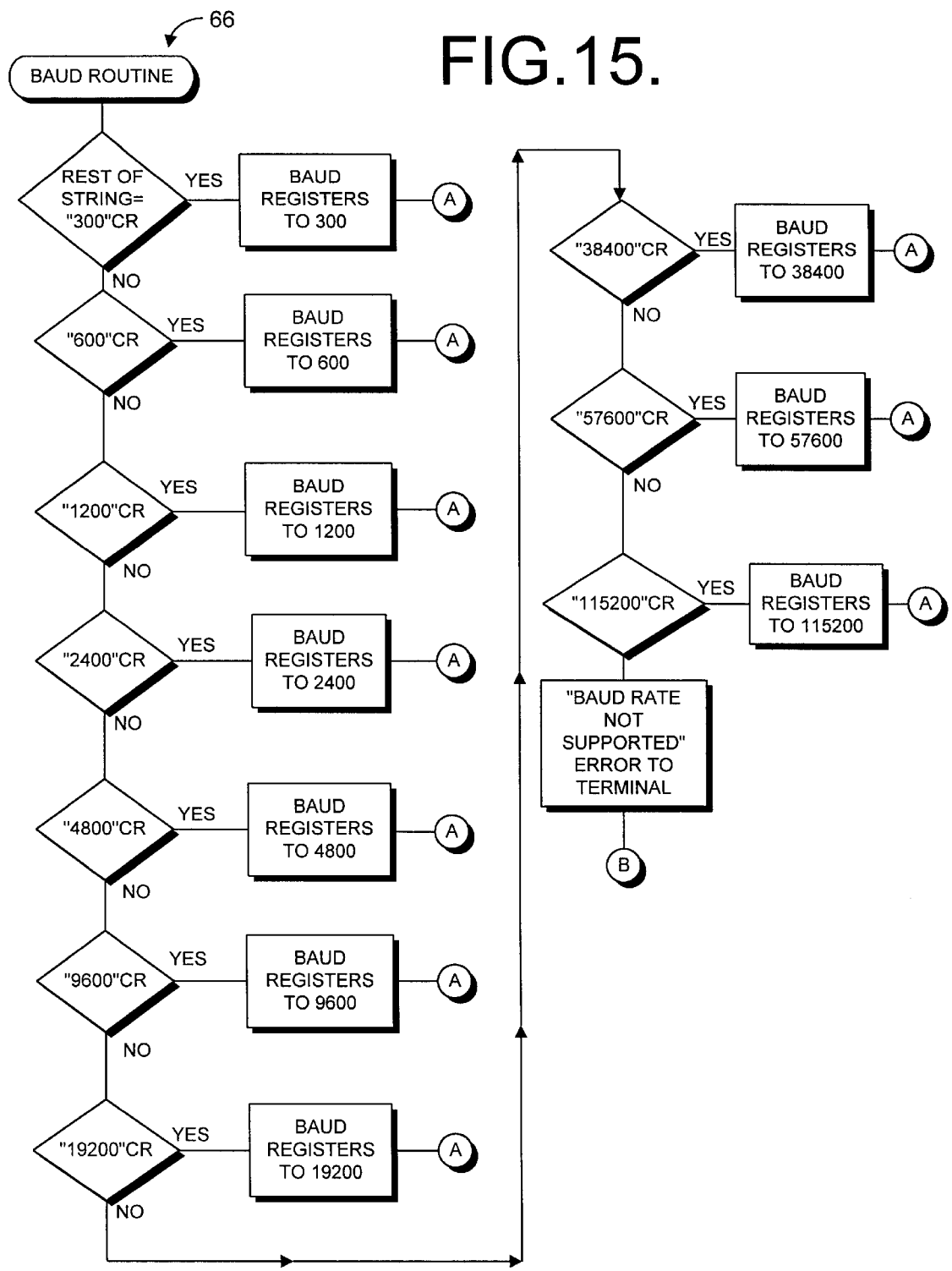
FIG. 15 is a flow chart illustrating a Baud routine of the operating program.

FIGS. 14–27 illustrate routines of an exemplary operating program 60. FIG. 14 illustrates a reset or power-up routine 61 and a main loop 62 of the operating program 60. The reset routine 61 checks the level on the BAUD terminal of the adapter 1 (FIG. 3) and sets the initial BAUD or communication rate accordingly. All variables and functions are reset to startup conditions, and a welcome message is sent to the host 2 which is referred to in the flow charts as the terminal. The program 60 then enters the main loop 62.

In addition to the reset routine 61, the main loop 62 has three entry points labeled A, B, and C within circles in FIG. 14. The entry point A is the normal point of entry of routines returning control to the main loop 62 and causes an "OK" message to be sent to the terminal 2. The entry point B is primarily the point of return when error conditions have been detected and an error message sent to the terminal 2. A point B return enters the main loop 62 at the same place as a point A return, except that a point B return does not send an "OK" message. A point C return is the result of the assertion of an IRQH or IRQL interrupt, as will be described below.

The main loop 62 generally parses the first letter of a received command and passes control to one of a number of adapter operations 64. Control is passed to a Baud routine 66 if the first letter is a "B"; to a results or number system configuration routine 67 if the first letter is a "C"; to a help routine 68 if the first letter is an "H" or a "?"; to an off or modem disconnection routine 69 as will be described below if the first letter is an "O"; to one of a number of port routines 70 if the first letter is a "P"; to a reset routine 71 if the first letter is an "R"; to a stepper motor routine 72 if the first letter is an "S"; or to a pulse width modulation (PWM) routine 73 if the first letter is a "W". If the first letter is an "@" (at) symbol, the previously entered command is repeated, as shown at 74 in FIG. 14. Any other first letter or symbol causes a "syntax error" to be generated and sent to the terminal 2, after which, the main loop 62 is re-entered at point B.

In the Baud routine 66 (FIG. 15.), the rest of the command string is parsed to extract one of a number of standard Baud rates for communication between the terminal or host computer 2 and the adapter 1 over the serial interface formed by the host serial port 4 and the adapter serial port 24. If the requested Baud rate is allowed, data representing the requested Baud rate is stored in a set of Baud registers, and control is returned to the main loop 62 at entry point A in FIG. 14. If the requested Baud rate is not an allowed rate, a "Baud rate not supported" error is sent to the terminal 2, and control is returned to the main loop 62 at entry point B. The Baud routine 66 overrides the communication rate set by the logic level on the BAUD pin in FIG. 3. It should be noted that while communication rates higher than 9600 Bauds are supported by the adapter 1, communication errors are more frequent at the higher speeds.

Figure 16:
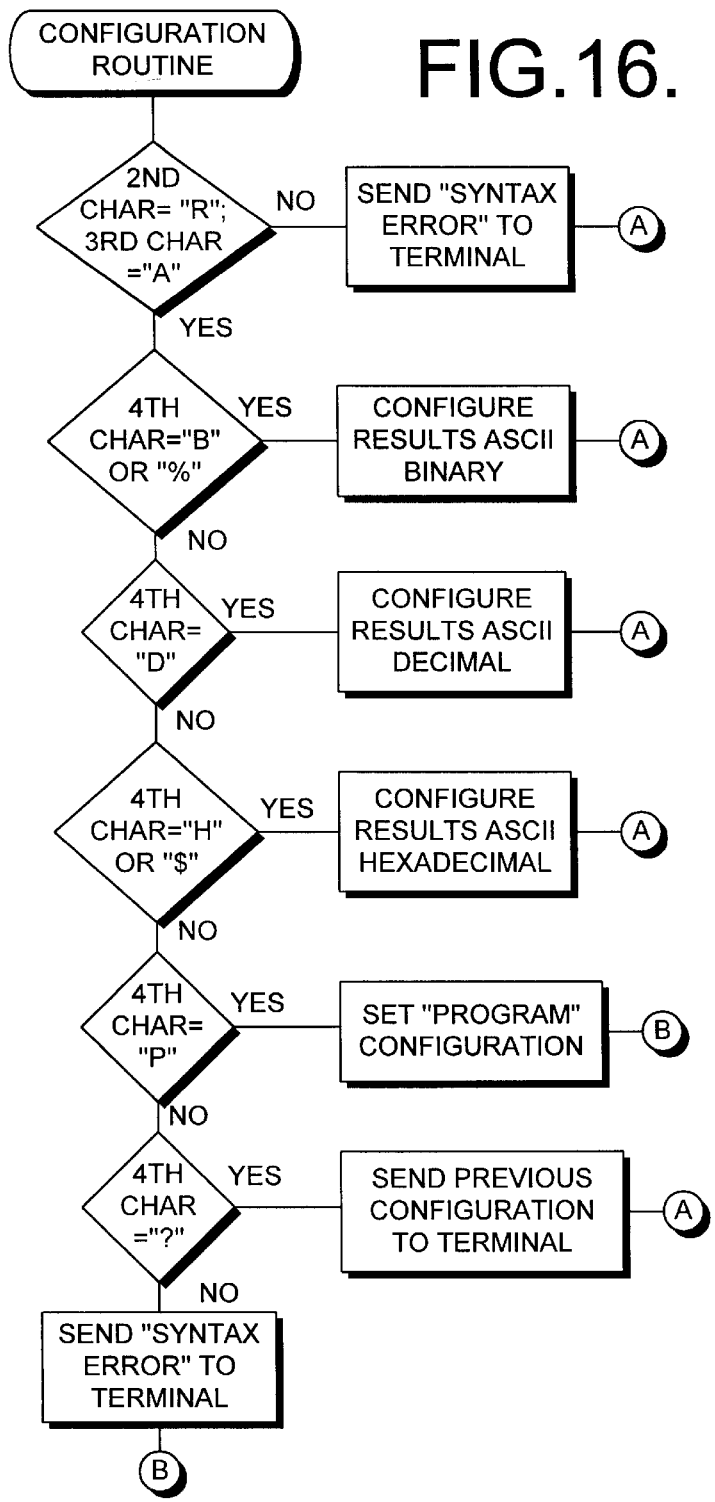
FIG. 16 is a flow chart illustrating a configuration routine of the operating program.
Figure 17:
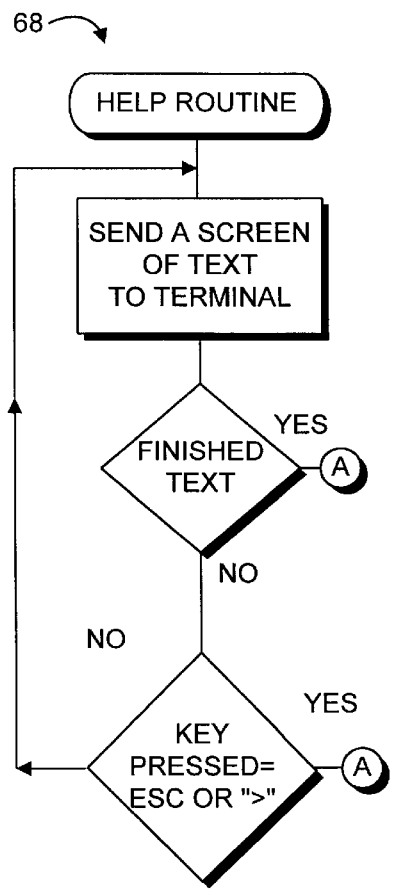
FIG. 17 is a flow chart illustrating a help routine of the operating program.

The configuration routine 67 shown in FIG. 16 sets the principal number system in which numeric values are entered at and reported to the terminal 2 by the program 60. As stated previously, all commands and data entered from or reported to the terminal 2 are encoded in ASCII. The default configuration at reset or power-up is decimal. Numeric values may be advantageously represented by ASCII encoded values in binary, decimal, or hexadecimal numbers. The set configuration is overridden and decimal configuration is used whenever a value exceeds the equivalent of decimal 255, which is the largest decimal value which can be represented by a single byte in binary or hexadecimal.

The configuration routine 67 parses the second, third, and fourth characters of a command beginning with a "C". A "B" or "%" symbol as the fourth character causes binary configuration to be set; a "D" causes decimal mode to be set; and an "H" or "$" causes hexadecimal to be set. If the fourth character is a "P", a program mode is set in which the operating program 60 communicates with a process control program 20 executing in the host computer 2. In the program mode or configuration, human readable explanations of error codes are suppressed. When program configuration is set, control is returned to the main loop 62 at point B. Control is returned from all other configuration settings to point A. A "?" as the fourth character is a query as to the current configuration and causes the previously set configuration to be sent to the terminal 2.

The help routine 68 (FIG. 17) causes a summary of all the available commands to be sent to the terminal 2. Pressing any key except the greater-than (>) or escape (Esc) keys causes the screen 16 to scroll. When the complete command summary text has been displayed, control is returned to point A of the main loop 62.

Figure 22:
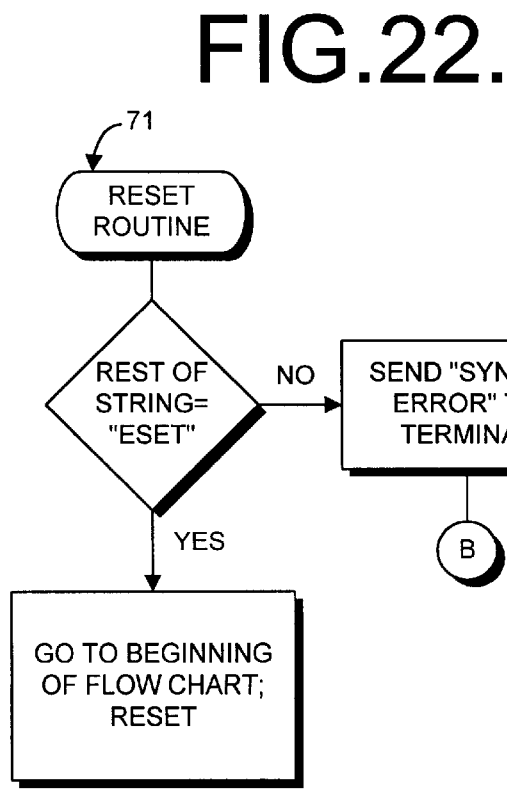
FIG. 22 is a flow chart illustrating a reset routine of the operating program.

FIG. 22 illustrates the reset routine 71 which enables the user to manually cause a software reset of the adapter operating program 60 which returns control to the reset routine 61 of FIG. 14.

Figures 18, 19:
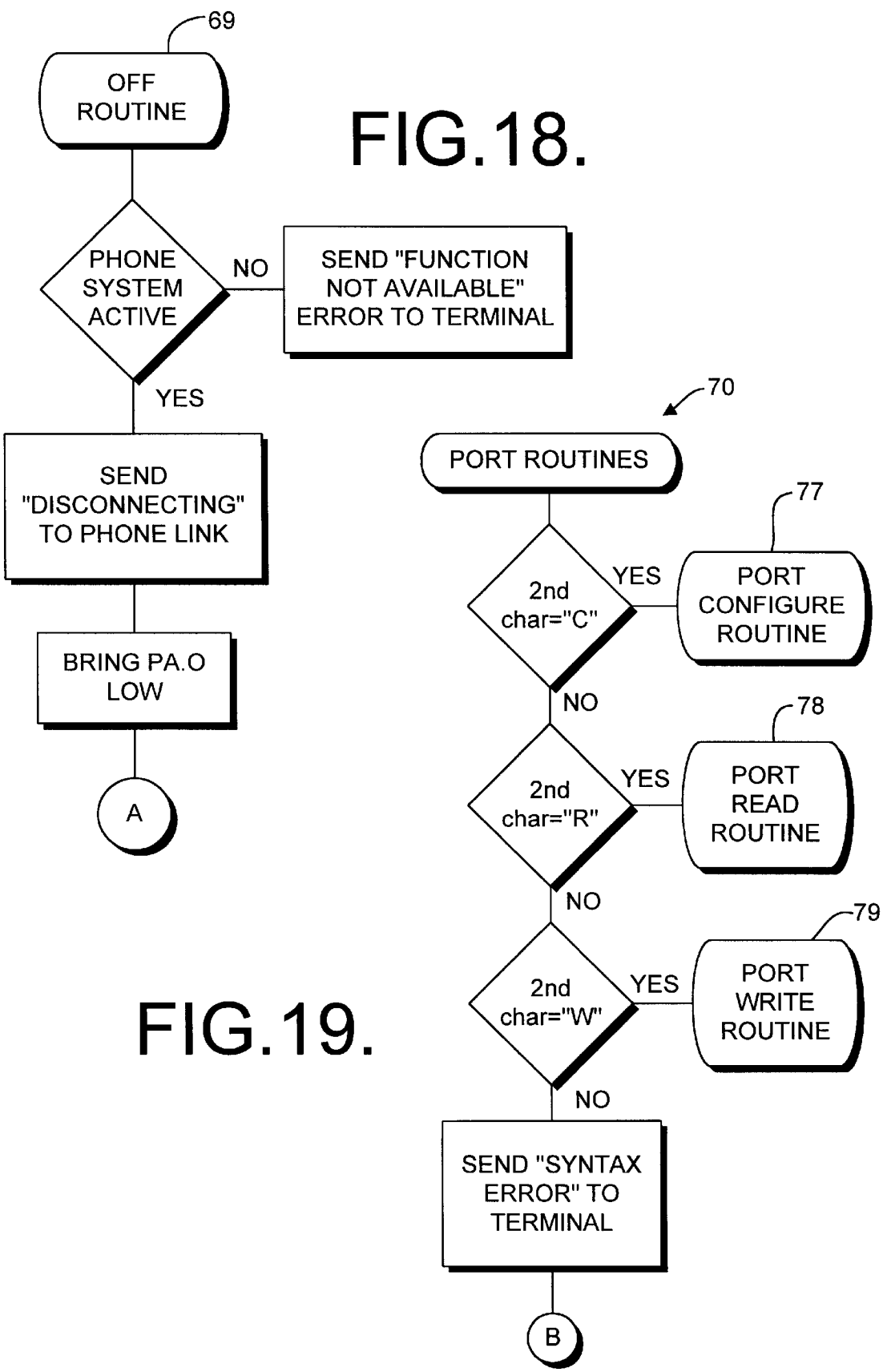
FIG. 18 is a flow chart illustrating an "off" or disconnect routine of the operating program.
FIG. 19 is a flow chart illustrating an overall port routine of the operating program.
Figure 20:
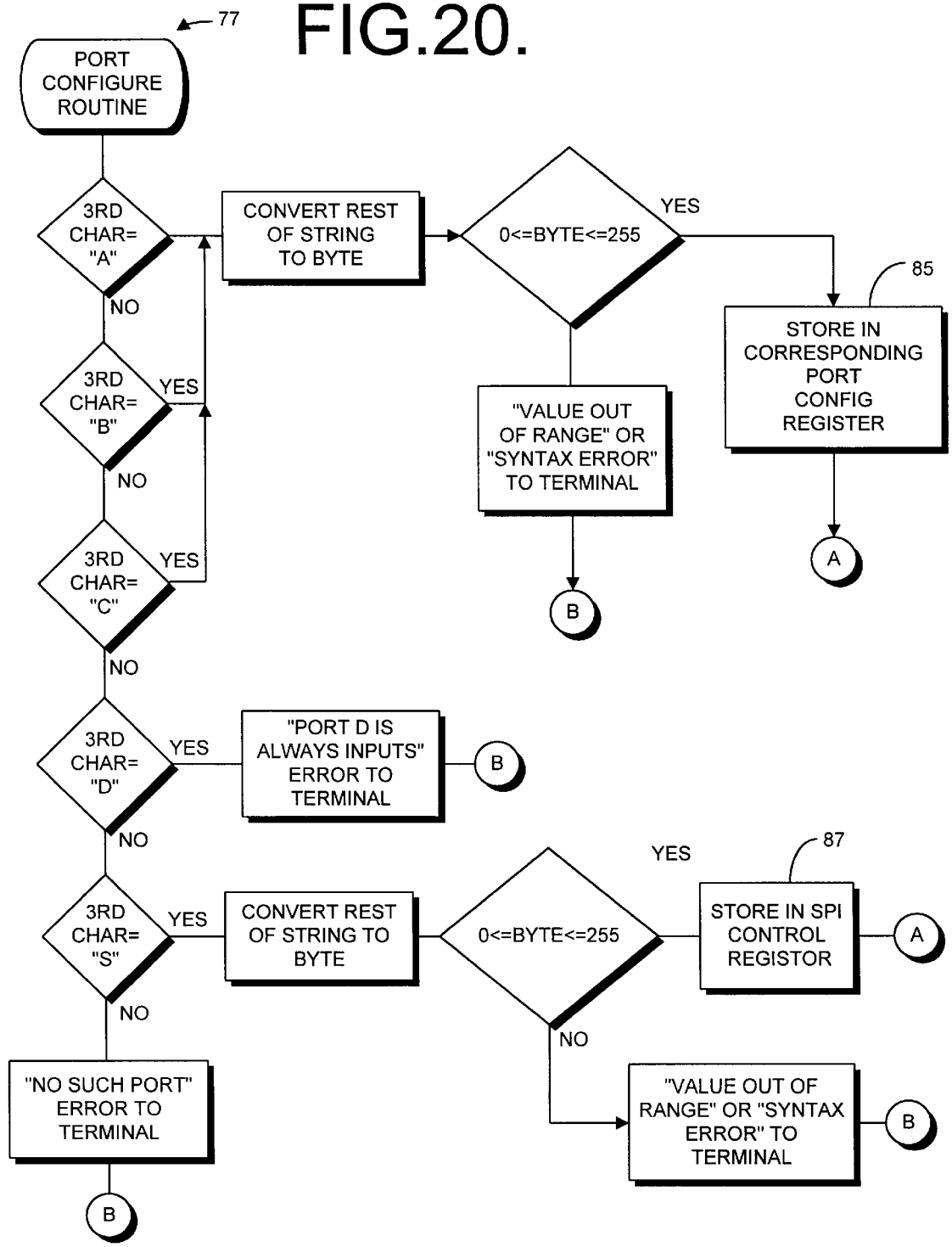
FIG. 20 is a flow chart illustrating a port configure routine of the operating program.

Referring to FIG. 19, the port routines 70 are broken down into a port configure routine 77, a port read routine 78, and a port write routine 79 according to whether the second letter following a command beginning with a "P" is respectively a "C", an "R", or a "W".

The port configuration routine 77 (FIG. 20) looks for an "A", "B", or "C" after a "PC" command to configure the peripheral ports 25 designated respectively as port A 81 (FIG. 3), port B 82, or port C 83. A value following the port designation letter is converted to a binary configuration byte and is written to a port configuration register, also known as a data direction register, at 85 in FIG. 20. After a reset or at power-up, all the peripheral lines 47 of the peripheral ports 25 are initially configured as input lines. In the configuration byte, a logic one configures a corresponding peripheral line 47 as an output line, while a logic zero configures or reconfigures the corresponding line as an input line. Port D 50 is always an input port and does not require configuration. Attempts to configure port D generate an error message. An "S" as the third character of a port configuration command is directed to the synchronous serial port 30. Any other letter following a "PC" command is interpreted as a syntax error.

The synchronous serial port 30 is provided for interfacing the adapter 1 to devices which communicate in a synchronous serial manner, such as some analog to digital and digital to analog converters and the like (not shown). The port 30 of the illustrated adapter 1 operates as a fixed speed circular shift register at 57.6 Khz of which eight bits are within the adapter 1 and eight bits are in the peripheral device connected to the port 30. The port 30 is enabled and configured by writing a configuration byte to a control register of the port 30, as shown at 87 in FIG. 20. In the configuration byte, bit 7 must be a logic one to enable the port 30; bits 6, 5, 4, and 3 are irrelevant; bit 2 determines the polarity of the clock signal on the PS_CX pin (FIG. 3) wherein a zero causes the clock to idle low and a one causes the clock to idle high; bit 1 controls the phase of the clock wherein a zero causes the clock to be in phase with the data and a one causes the clock to be out of phase with the data; and bit 0 controls the order of the bytes of data bytes received by the port 30 wherein a zero preserves the bit order and a one reverses the bit order with more significant bits preceding less significant bits.

Figure 21:
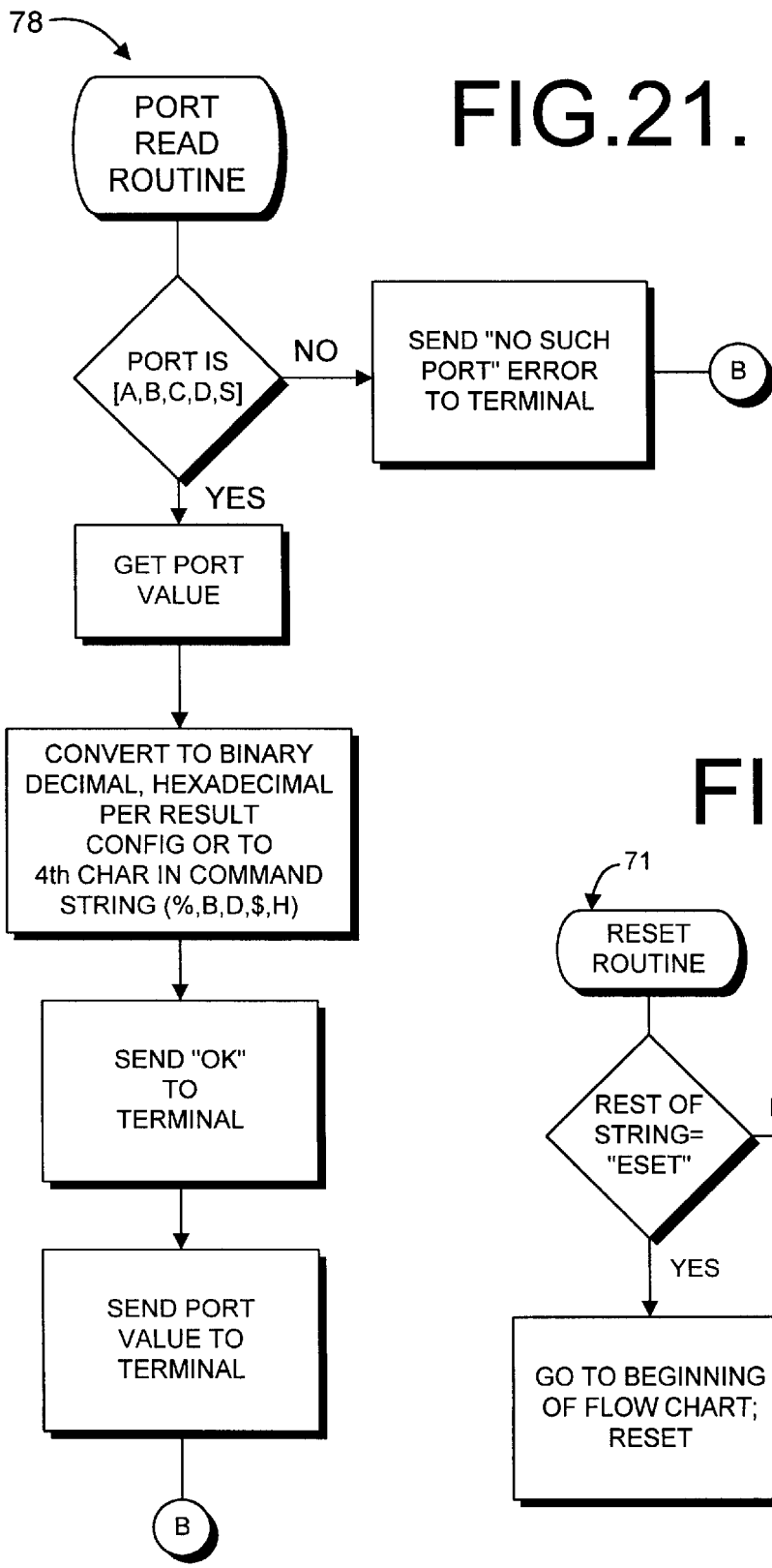
FIG. 21 is a flow chart illustrating a port read routine of the operating program.
Figure 23:
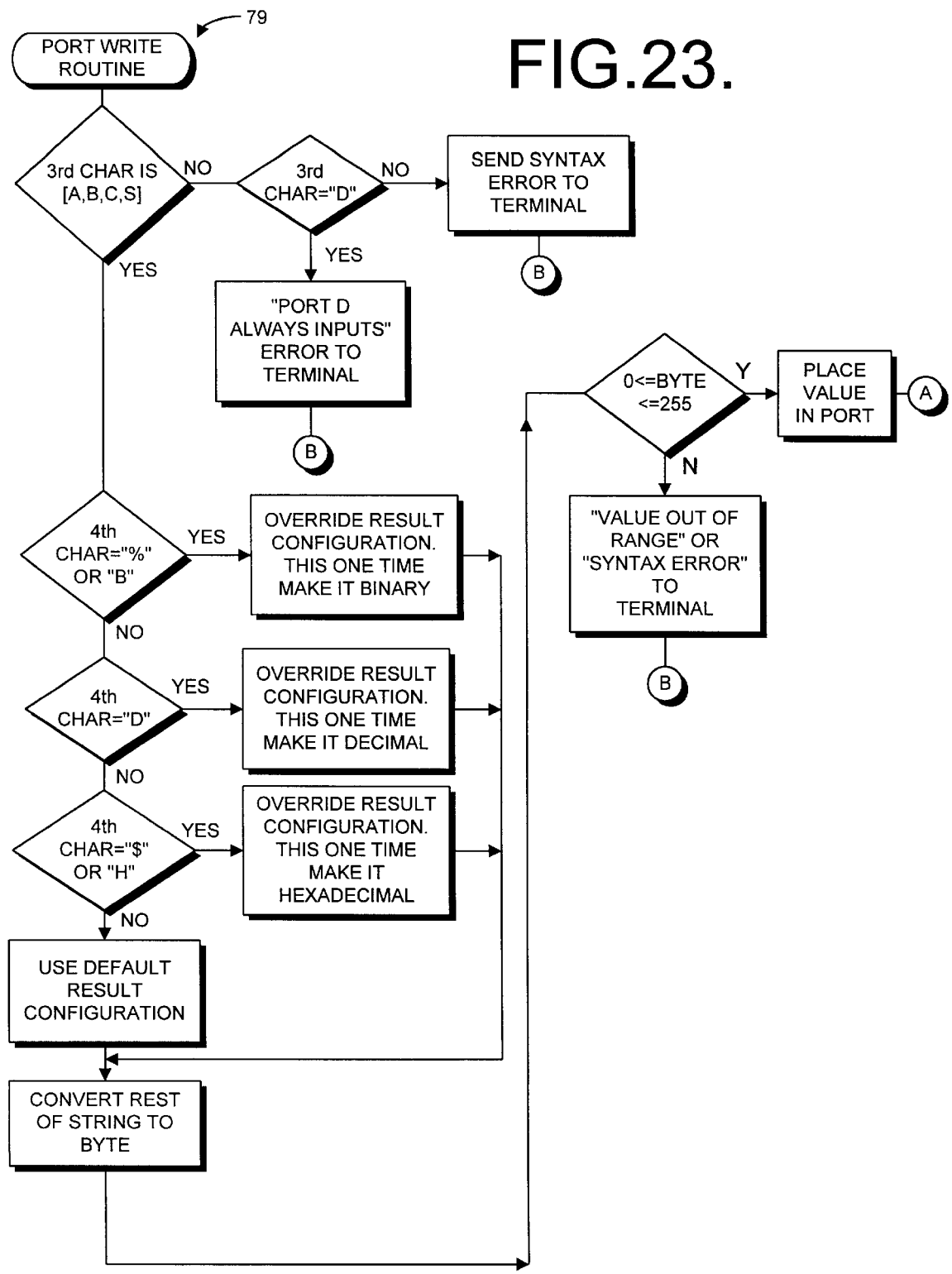
FIG. 23 is a flow chart illustrating a port write routine of the operating program.

In the port read routine 78 in FIG. 21, a port read command ("PR") followed by an existing port name (A, B, C, D, or S) causes the binary value currently present on the port to be obtained and converted to the number system specified by the current results configuration or by a fourth character in the command (&, B, D, $, or H). The converted value is then sent to the terminal 2. The port write routine 79 in FIG. 23 is similar in many respects to the port read routine 78 in a converse sense, except that an attempt to write to port D 50 generates an error message.

Figure 4:
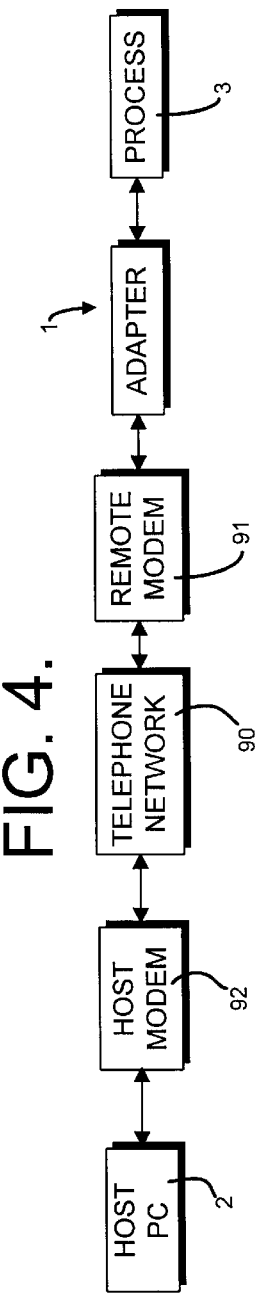
FIG. 4 is a simplified block diagram illustrating remote communication between the host computer and the interface adapter of the present invention over a telephone network using modems.
Figure 5:
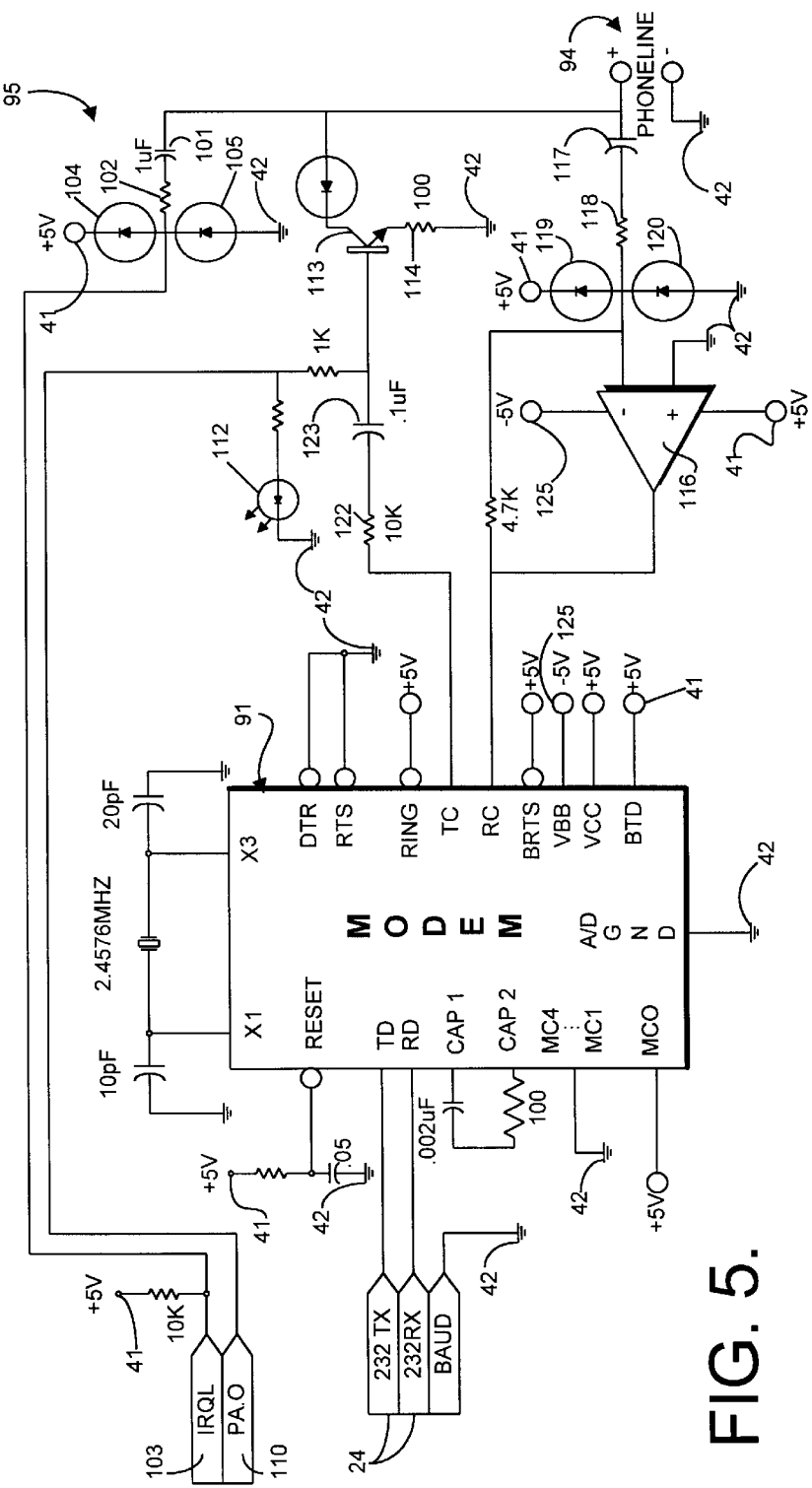
FIG. 5 is a circuit diagram illustrating modem circuitry suitable for use with the interface adapter of the present invention for communication with the host computer over a telephone network.

Referring to FIGS. 4 and 5, the illustrated adapter 1 has the capability of being remotely communicated with by the host computer 2 over a telephone network 90 by means of a remote modem 91 connected to the serial port 24 of the adapter 1 and a host modem 92 connected to the host computer 2, either externally to a host serial port 4 or internally within the computer 2. FIG. 5 illustrates an exemplary circuit for connecting a modem 91 between the adapter serial port 24 and a telephone line 94 of the telephone network 90. The illustrated remote modem 91 is a single chip modem such as an AD7910 or AD7911. As illustrated, the modem circuitry 95 is configured so that the host computer 2 can call the adapter 1, but the adapter 1 cannot call the host 2. Alternatively, with suitable circuitry and programming, the adapter 1 could initiate a call to the host 2, for example, to alert the host 2 to a critical condition detected within the process 3. In the illustrated circuit 95, the adapter 1 is only operated at a 300 Baud communication rate; thus, the BAUD pin (FIG. 3) on the adapter 1 is connected to ground 42 to set the communication rate at 300 Bauds.

Referring to FIG. 5, an incoming ring signal on the phone line 94 is a 90 volt, 16 Hz signal which is coupled through a capacitor 101 and a resistor 102 to the low interrupt terminal of the adapter 1, designated as IRQL terminal 103 in FIG. 5, causing it to go low. Diodes 104 and 105 limit the ring signal to zero and five volts. IRQL going low causes the adapter operating program 60 to enter an IRQL service routine 107 (FIG. 26). If no previous command has been entered since power-up or the most previous reset, the phone mode is activated at 108 (FIG. 26). Pin 0 of port A 81, designated PA.0 110 (FIG. 5), is isolated from port A 81 and is set high. The high on PA.0 activates a monitor LED 112 and saturates a transistor 113 which switches a resistor 114 across the phone line 94, thereby effectively answering the call. The modem chip 91 receives the incoming signal by way of an amplifier 116 which is coupled by a capacitor 117, a resistor 118, and a pair of limiting diodes 119 and 120 to the phone line 94. The amplifier 116 may be a 741 op-amp or an equivalent. The modem 91 transmits to the phone line 94 by way of a resistor 122 and a capacitor 123 through the transistor 113 to the phone line 94. The incoming and outgoing tones are configured for a 300 Baud full duplex link. It should be noted that the modem chip 91 and the amplifier 116 require a negative five volt connection 125 in addition to the positive five volt connections 41.

Seven seconds after the modem 91 answers, the adapter 1 sends a message to the host computer 2 advising the user to send a command within thirty seconds or the adapter 1 will disconnect the modem 91 from the phone line 94. If no command is received from the host computer 2 within thirty seconds, the adapter 1 sends a disconnect message at 127 (FIG. 26) and sets PA.0 110 low which cuts off transistor 113, thereby disconnecting the modem 91 from the phone line 94. If a command is received from the host 2, control is returned to the main loop 62 at entry point C (FIG. 14), and the 30 second clock is reset. During the time that the adapter 1 is awaiting commands, the results configuration routing 67, the help routine 68, the port routines 70, the stepper routines 72, the PWM routine 73, and other routines are available. Thus, while the modem 91 is connected, the peripheral ports can be configured, written to, or read from, either manually or under the control of a process control program 20 running in the host computer 2.

In the phone mode of the adapter 1, every five minutes, the IRQL routine 107 at 108 "answers" or reconnects the modem 91 to the phone line 94, waits 30 seconds for a command from the host computer 2, and if no command is received enters the disconnect sequence 127. The user can manually cause the modem 91 to hang-up by entering an "off" command. The off routine 69 is illustrated in FIG. 18. A reset command occurring while the modem 91 is connected also causes the adapter 1 to hang-up the modem 91.

In addition to its use in association with the modem 91, the IRQL routine 107 can be used to respond to a high to low transition interrupt signal on the IRQL pin of the adapter 1 from the process 3. Similarly, an IRQH routine 130 (FIG. 27) can be used to respond to a low to high transition interrupt signal on the IRQH pin of the adapter 1. Interrupt signals are used for immediate responses to conditions within the process 3 for which it is not desirable to wait for a routine polling procedure by normal execution of the operating program 60. In the adapter 1, a low on the IRQL pin or a high on the IRQH pin causes a respective "L" or respectively "H" respectively message to be sent to the host computer 2. A process control program 20 running in the computer 2 can be used to interpret and respond to such interrupt messages.

The PWM signal generator 31 can be used in a number of applications, such as to generate an analog voltage or to regulate the speed of a DC motor (not shown) wherein speeds down to a few turns per minute can be achieved with minimal torque reduction. Musical tones can be created as can accurate, variable time intervals. The frequency range of the generator 31 of the illustrated adapter 1 extends from 10–10,000 Hz, and the duty cycle can be varied from 0 to 100 percent in one per cent intervals. However, there are limitations to the capabilities of the generator 31. The full duty cycle range is only available up to 220 Hz for a 1% duty cycle and to 230 Hz for a 99% duty cycle. Increasing the frequency compresses the available duty cycle range by about half. The PWM pin (FIG. 3) can be set high or low. At power-up or reset of the adapter 1, the PWM pin is set low.

Figure 25:
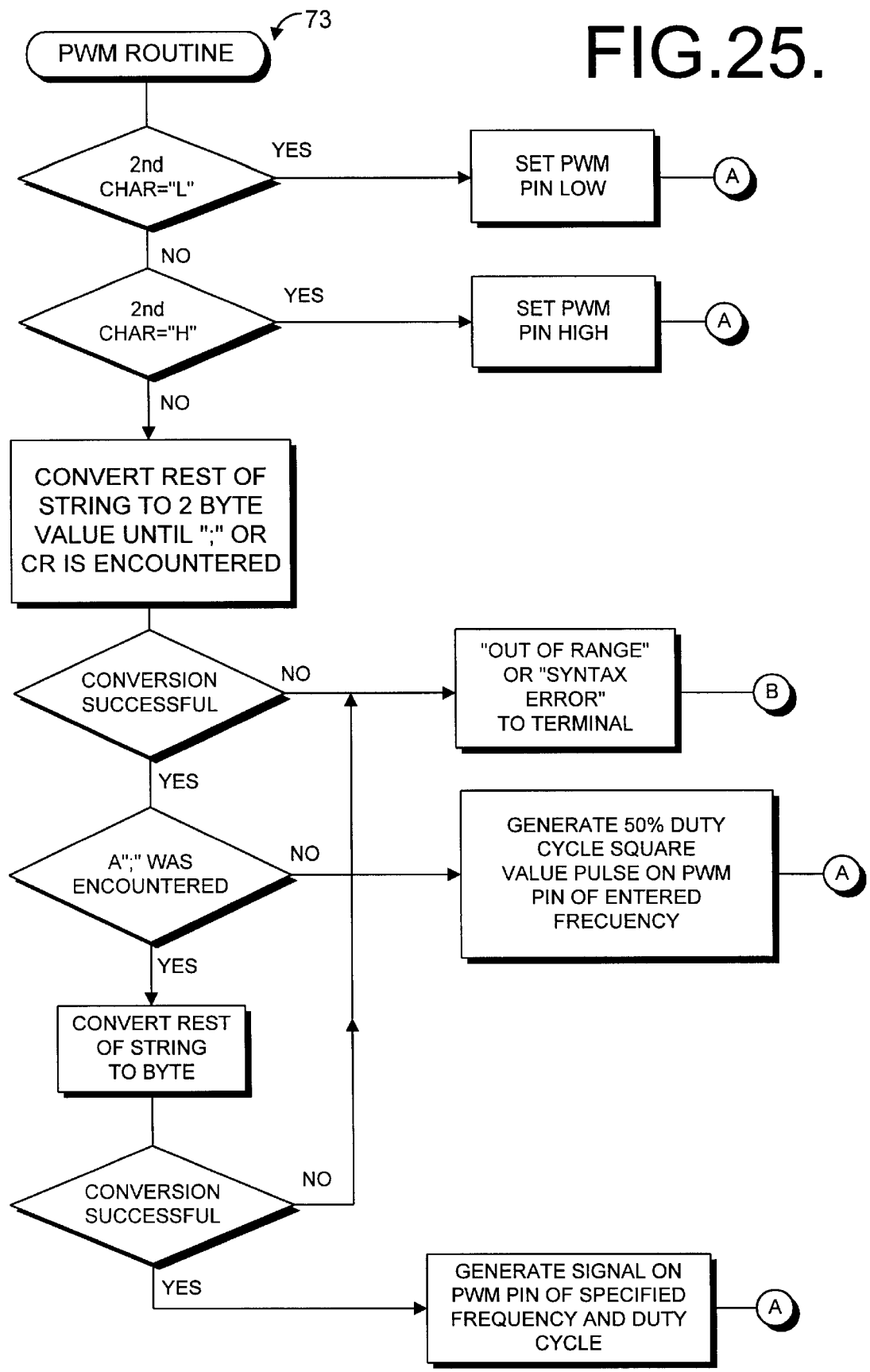
FIG. 25 is a flow chart illustrating pulse width modulation (PWM) routines of the operating program.

FIG. 25 illustrates the PWM routine 73 of the operating program 60. The PWM routine 73 is called by a command from the host computer 2 beginning with a "W" which is followed by an "L" or an "H" to set the PWM pin respectively low or high. The next components of the command are a frequency value and optionally a semicolon and a duty cycle value. If no duty cycle is specified, 50% duty cycle is set. If the specified frequency and duty cycles are within acceptable ranges, the parameters of the generator 31 are thus set, and control is passed from the PWM routine 73 to the main loop 62 of the program 60 at entry point A (FIG. 14).

FIG. 8 illustrates a simplified stepper motor 135. A stepper motor is designed in such a way that it turns one step at a time, allowing precise motion and absolute positioning of a rotor thereof. The illustrated stepper motor 135 includes a rotatably mounted rotor 136 formed as a permanent magnet which is surrounded by a plurality of stator poles 137, 138, 139, and 140 which are electromagnets and which are also referred to as phases.

The motor 135 can be energized in a number of ways to control the rotation of the rotor 136. The poles 137–140 can be energized one at a time in a sequence such as A, B, C, D, A . . . etc. This control sequence is referred to as one-phase-on or monophasic control. In monophasic control, the rotor 136 aligns with the stator pole which is energized. The poles 137–140 can also be energized two at a time in a sequence such as AB, BC, CD, DA, AB . . . etc. This control sequence is referred to as two-phase-on or biphasic control, in which the rotor 136 aligns between the energized pair of stator poles, as shown in phantom in FIG. 8. This configuration provides the highest torque and is the one most commonly employed. Finally, the monophasic and biphasic steps can be combined in an interleaved sequence, such as A, AB, B, BC, C, CD, D, AD, A . . . etc. This sequence is referred to as half-step control and, as the name implies, results in finer steps than either monophasic or biphasic control. In the half-step mode, the rotor 136 of the illustrated stepper motor 135 turns 45° per step. In practice, real stepper motors have many more poles on the stator and rotor, allowing for much smaller angles per step. The rotational direction of the rotor 136 can be reversed by reversing any of the sequences described above.

Figure 24A:
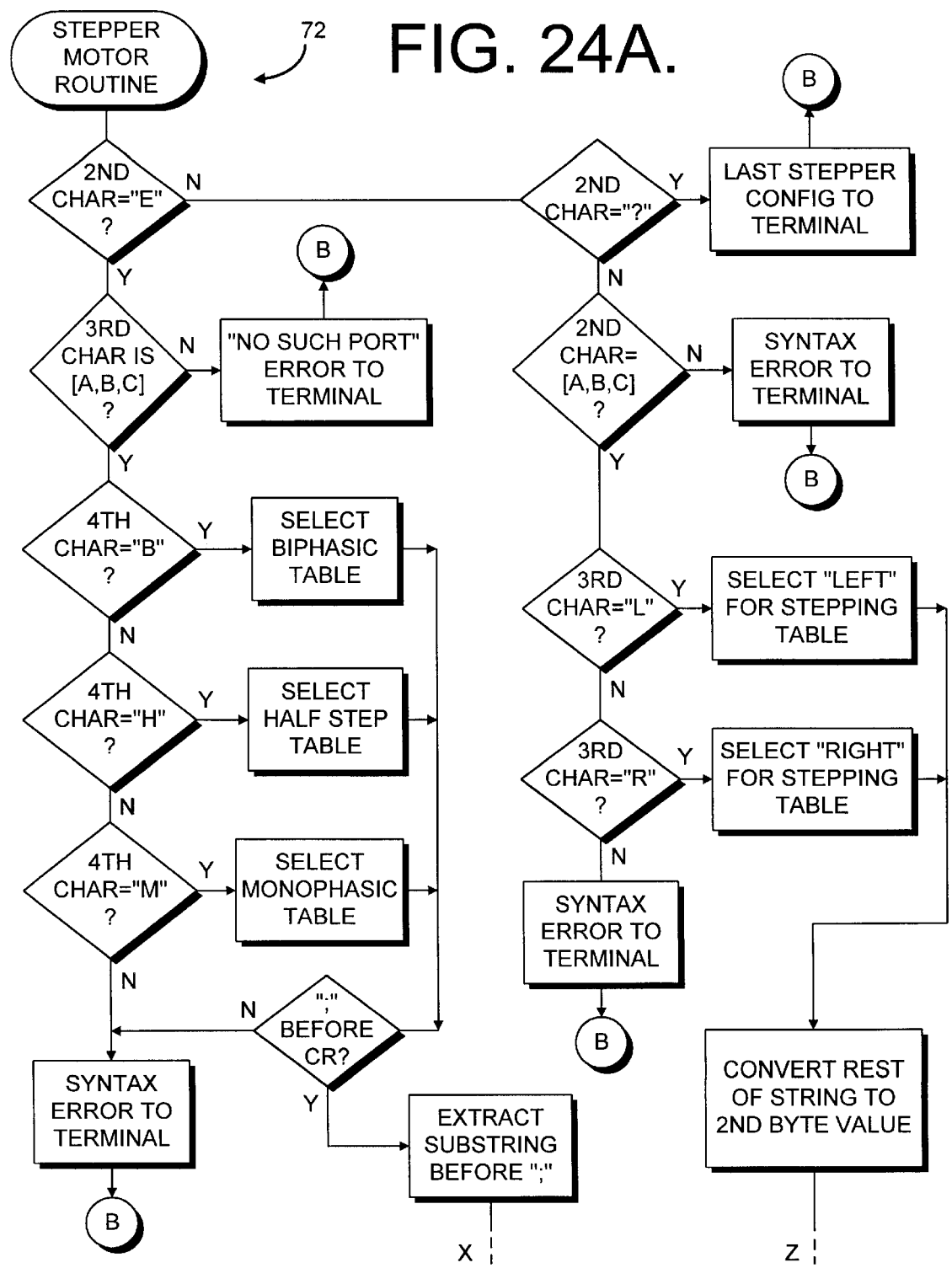
FIGS. 24A and 24B are portions (connected by continuation lines X and Z) of a flow chart illustrating stepper motor control routines of the operating program.
Figure 24B:
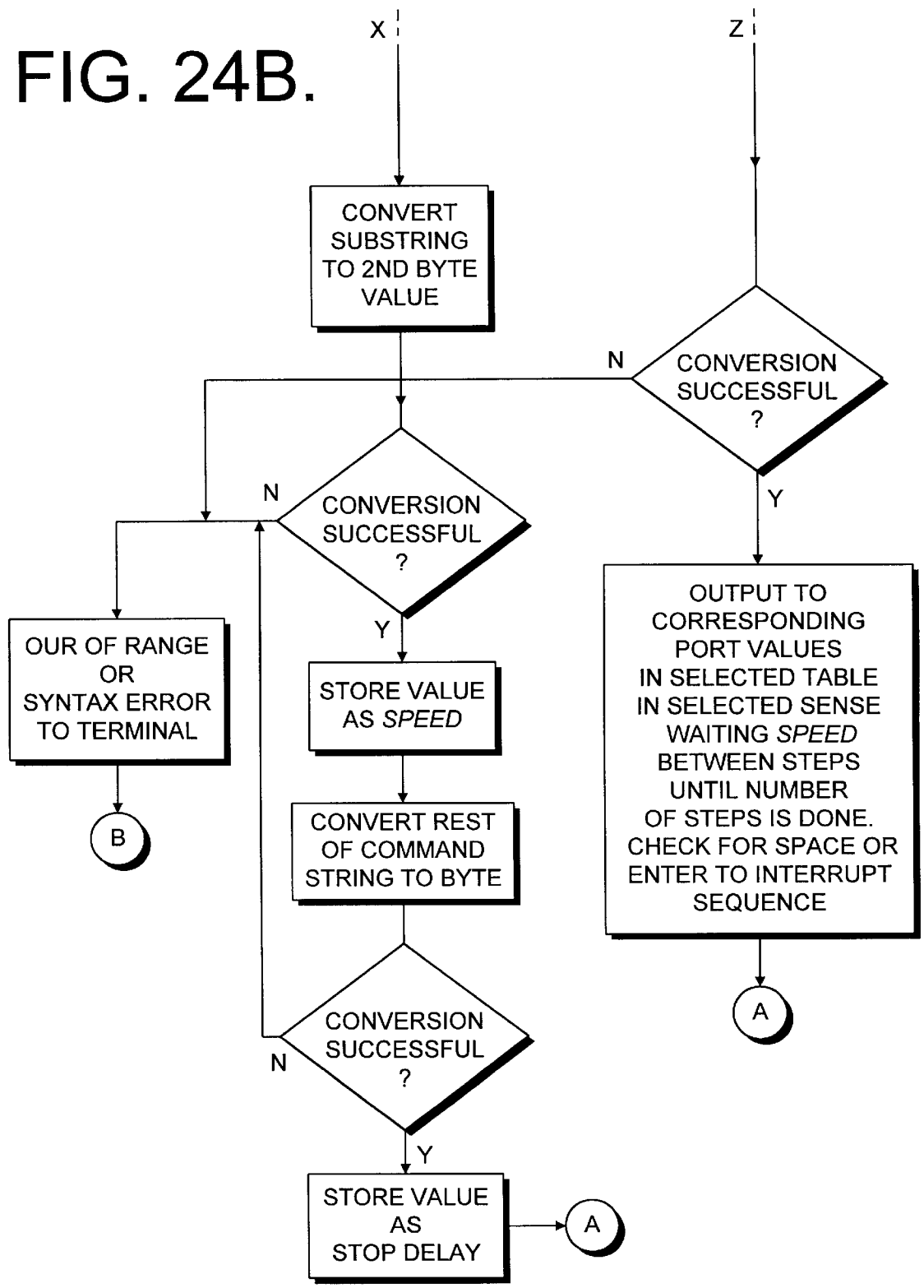

FIGS. 24A and 24B illustrate portions of an exemplary stepper motor routine 72 for controlling a stepper motor, such as the motor 135. As stated previously, the upper four bits (bits 4–7) of each of the general peripheral ports 25, including port A 81, port B 82, and port C 83, are used in the adapter 1 as a stepper motor control port 32. The stepper ports 81, 82, and 83 are enabled one at a time by an "E" following an "S" (stepper command), followed by an "A", "B", or "C" to designate the port 81, 82, or 83 respectively. If the fourth character in the command is a "B", "H", or "M", a corresponding table of stepper control bit sequences is selected, including respectively a biphasic table 144 (FIG. 10), a half-step table 145 (FIG. 11), or a monophasic table 146 (FIG. 9). The tables 146, 144, and 145 illustrated in FIGS. 9–11 show exemplary sequences of four bit activation patterns which are stored in the ROM 26 of the adapter 1 and which are sequentially written to the respective stepper control port 32 to control the energizing of the stator poles 137–140 to control the operation of the motor 135. It should be realized that suitable amplifiers or drivers (not shown) would be connected between the ports 32 and the stator poles 137–140 to provide sufficient drive current for the respective poles.

Following the designation of one of the control modes in the stepper command, a speed value, a ";" (semicolon), and a stop delay value are processed. In the illustrated adapter 1, the speed can range from 10 to 4000 steps per second. The stop delay specifies the number of steps that the last value written on the stepper control port 32 remains fixed, which serves to brake the rotor 136 and prevent it from continuing to turn after the last step due to inertia. The stop delay can range from 0–255.

Once a stepper port 32 has been enabled, the motor 135 interfaced thereto can be stepped by entering a step command comprising "S", a port name (A, B, or C), "L" or "R" to indicate the rotation sense, and a value indicating the number of steps. Preferably, the routine 72 includes the capability of disabling a specific stepper port 32. Such a stepper disable command (not shown) would cause the adapter 1 to ignore step commands directed to the disabled port 32 until the port is re-enabled. Additionally, it is desirable to provide means for selectively stopping a motor 135 during a stepping operation, such as by sending a selected character from the host computer 2.

Figure 7:
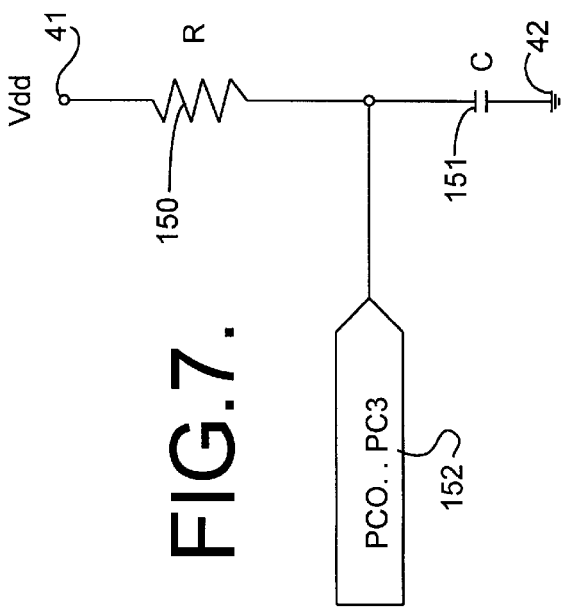
FIG. 7 is a circuit diagram illustrating the connection of a resistor or resistive element and a capacitor or capacitive element for digital measurement of the resistance or capacitance thereof using the routine shown in FIG. 6.
Figure 6:
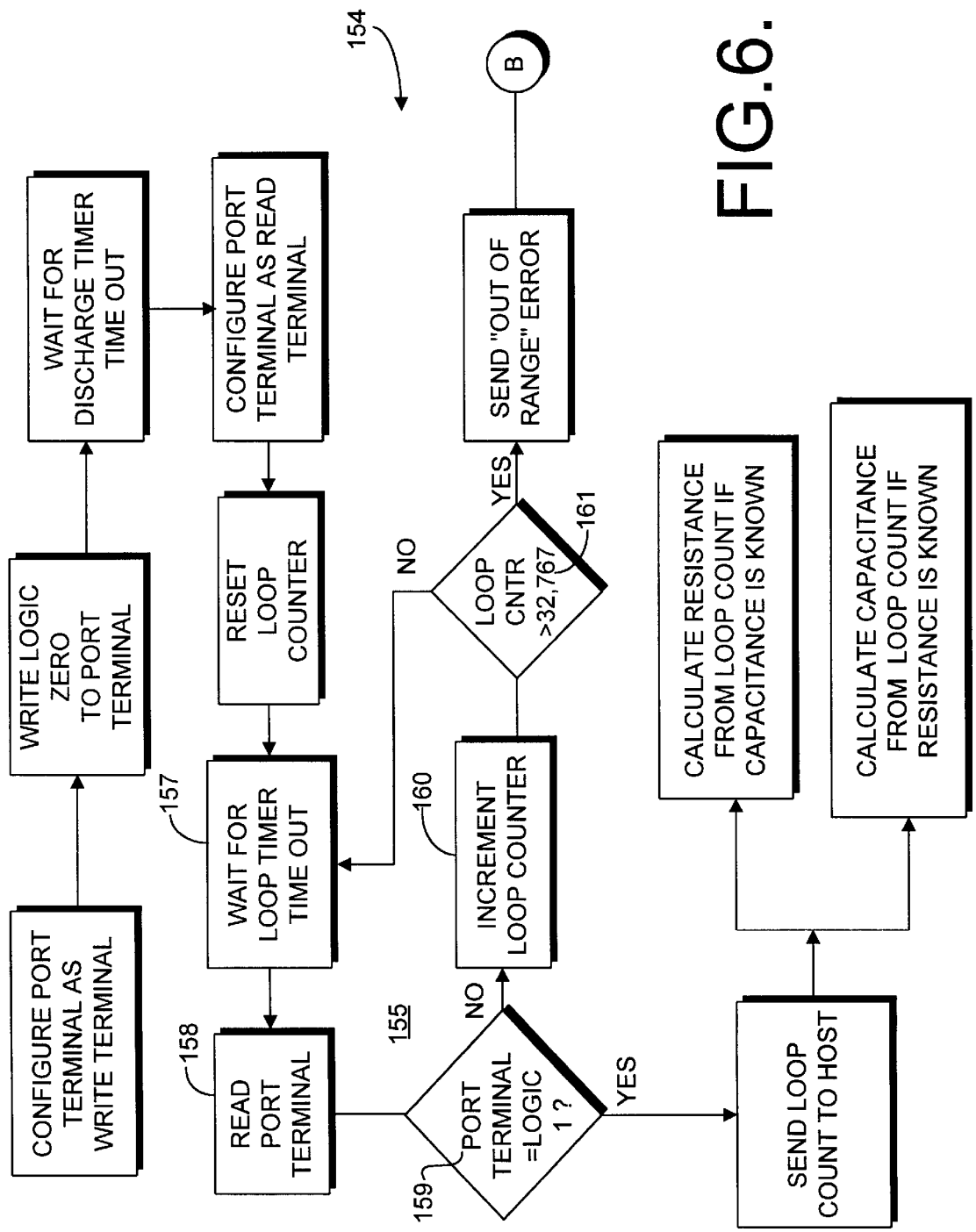
FIG. 6 is a flow diagram illustrating a routine for digitally measuring relative resistance or capacitance without the need of an analog to digital converter using the interface adapter of the present invention.

The adapter 1 of the present invention can be used to measure relative resistance of a resistive element or the relative capacitance of a capacitive element without the use of an analog to digital converter. FIG. 7 shows the manner of connecting a serial combination of a resistor 150 and a capacitor 151 between the positive supply 41 and ground or reference 42. One of the terminals 152 of the RC measurement port 33 is connected between the resistor 150 and capacitor 151. The value of one of the elements 150 or 151 must be known. FIG. 6 illustrates an RC measurement routine 154 which is preferably accessible from the operating program 60 using an "R" (for resistance) command together with a "0", "1", "2", or "3" to indicate the terminal of the RC measurement port 33 through which the measurement is to be made. Referring to FIG. 3, pins 0–3 of port C 83 provide the capability of measuring any combination of resistances and/or capacitances adding up to four. Alternatively, the adapter 1 could be programmed to provide for the measurement of more or fewer resistances and/or capacitances.

In general, the routine 154 causes the adapter 1 to time the charging of the capacitor 151 through the resistor 150 to determine the RC time constant or charging time of the circuit combination. Knowing the RC charging time, and the value of either the capacitor 151 or the resistor 150, the value of the other component can be determined by appropriate manipulation of the well-known formula: RC time=R*C.

The illustrated routine 154 measures the relative charging time by counting software loops. Thus, the count obtained for a given absolute time depends on the execution speed of the software loop. The execution speed of the software loop can be determined by measuring the charging time of the combination of a known capacitance through a known resistance whereby any measured charging count can be calibrated to an actual resistance or capacitance. The illustrated adapter 1 has limitations as far as its accurate range of measurement is concerned and can measure resistances between 200 Ohms and 10 Megohms using different capacitor values for the desired range. Readings below 500 Ohms decrease in accuracy. Accuracy can also be affected by other devices of the process 3 which generate interrupts having higher priority than the RC measurement routine 154.

In the RC measurement routine 154, the desired terminal 152 (PC0–PC3) of the port 33 is configured as a write terminal, and a logic zero is written to the port terminal 152 to discharge the capacitor 151. After an appropriate period for the discharge to occur, the port terminal 152 is reconfigured as a read terminal, a loop counter is reset to zero, and an RC measurement loop 155 is entered. As each loop 155 is executed, a loop timer times out at 157 after which the port terminal 152 is read at 158 and tested at 159 to determine if the voltage across the capacitor 151 has risen to the level of a logic one. If not, a loop counter is incremented at 160 and the current loop count is tested at 161 to determine if it is within an acceptable range. If the loop count exceeds the acceptable range, an "out of range" error is sent to the host computer 2, and control is passed to the main loop 60 at entry point B. When the voltage on the port terminal 152 rises to a logic one, the loop 155 is exited, the loop count is sent to the host computer 2, and the resistance or capacitance is calculated using the known factors to determine a relative value which may be converted to an actual value, as described above.

FIG. 12 diagrammatically illustrates an exemplary process, in the form of an oil pumping process or station 6, which is controlled by a host computer 2 by interfacing (FIG. 13) the process 6 thereto through the adapter 1. As illustrated in FIG. 13, the adapter 1 of pump station control circuitry 164 is intended to communicate with the host computer 2 over a modem, such as the modem 91 using the type of modem circuitry 95 shown in FIG. 5. The pumping station 6 pumps oil 165 from an oil well 166 below the ground level 167 and into a storage tank 168 using a pump and motor set 169 including a motor 170.

The motor 170 is controlled in an on/off manner through a motor relay 171 and a motor relay drive transistor 172. It is desirable to monitor the temperature of the motor 170 at various points. For this purpose, respective heat sensors 173, 174, and 175 are thermally coupled with the motor 170 at critical locations thereon. The sensors 173–175 may, for example, be thermistors whose resistance is inversely related to the sensed temperature. The level of oil 165 in the tank 168 is detected by a level float 177 which is connected to a resistive level sensor 178 whose resistance is proportional to the level of oil 165 in the tank 168. The speed of the motor 170 is detected by a switching device or RPM switch 180 (FIG. 13) associated with a shaft (not shown) of the motor 170 and which may involve a light source and a light detector (not shown) which are interrupted at a rate proportional to the rotational speed of the motor 170. The flow of oil 165 from the pump set 169 to the tank 168 is measured by a rotary flow sensor 181 including a flow switch 182 which switches at a rate proportional to the flow of oil through the sensor 181. Flow of oil through the process 6 is controlled by a supply valve 184 in a supply conduit 185 extending between the well 166 and the motor/pump set 169 and a return valve 186 in a return conduit 187 connecting between the tank 168 and the supply conduit 185.

Referring to FIG. 13, each of the heat sensors 173–175 and the oil level sensor 178 are connected by a respective capacitor 189–192 of known value across the power supply positive terminal 41 and ground 42. Each of the sensors 173–175 and 178 is additionally connected to a respective terminal of the RC measurement port 33, respectively PC0–PC3 of port C of the adapter 1. The motor relay drive transistor 172 is connected to terminal PC4 of port C. The valves 184 and 186 are actuated by respective valve relays 194 and 196 which are driven by respective drive transistors 197 and 198 connected respectively to terminals PA4 and PA5 of port A of the adapter 1.

The RPM switch 180 and flow switch 182 are connected to a single counter (CTR) 199 through a multiplexer (MUX) 200 which is connected to terminals PA2 and PA3 of port A of the adapter 1. The counter 199 may be a CD4040, and the multiplexer 200 may be a CD4539. A reset terminal (RST) 201 of the counter is connected to terminal PA1 of port A. The output terminals Q1–Q4 of the counter 199 are connected respectively to terminals PD0–PD3 of port D, while the remaining output terminals Q5–Q12 are connected respectively to terminals PB0–PB7 of port B. The multiplexer 200 enables the counter 199 to accumulate pulses from either the RPM switch 180 or the flow switch 182 depending on the logic levels written to the multiplexer control terminals PA2 and PA3 thereby eliminating the need for two counters and reducing the number of control and read lines required.

The motor 170 and the valves 184 and 186 are controlled by writing the appropriate logic level to the port terminals of the port to which they are connected. The supply valve 184 is opened and the return valve 186 is closed whenever the pump set 169 is activated. When the motor 170 is deactivated to stop pumping, the supply valve 184 is closed and the return valve 186 is opened to circulate the oil 165 until the motor and pump 169 come to a halt. The heat sensors 173–175 and the oil level sensor 178 are read using the RC measurement routine 154 (FIG. 6). The motor speed and oil flow rate are measured by resetting the counter 199, writing appropriate logic levels to port A terminals PA2 and PA3 to cause the multiplexer 200 to transfer the pulses from either the RPM switch 180 or the flow switch 182 to the counter 199 for a selected length of time, disabling the multiplexer 200, and thereafter reading the binary values on port D and port B.

The adapter 1 may be controlled by a process control program 20 executing in the host computer 2 to thereby monitor and control the oil pumping process 6. If readings of the heat sensors 173–175, the oil level meter 178, the motor speed, or oil flow rate are out of appropriate ranges, alerts may be sent to the computer 2. The process control program 20 may include routines (not shown) to automatically shut down the oil pumping process 6 by deactivating the motor 170 in response to critical conditions as signaled by the sensors 173–175, 178, 180, and 182.

It should be noted that the host computer 2 could control a multitude of processes 3 using a single host serial port 4 by interfacing each process 3 to a respective adapter 1 and communicating with the adapters 1 over a telephone network 90 using modems 92 and 91.

It is to be understood that while certain forms of the present invention have been illustrated and described herein, it is not to be limited to the specific forms or arrangement of parts described and shown.

What is claimed and desired to be secured by Letters Patent is as follows:

1. A personal computer parallel interface adapter connectible between an external process and an existing serial port of a personal computer for control of the process by the computer, said adapter comprising:

(a) adapter serial port means including adapter serial port terminals to enable interfacing to an externally accessible serial port connector of a serial port of a personal computer;

(b) parallel port means including a plurality of parallel port terminals which can be individually configured as input terminals or output terminals, said parallel port means being adapted for connection thereto of components of a process external to said personal computer to enable control of said process by said personal computer;

(c) controller means interfaced between said serial port means and said parallel port means, said controller means being programmed to configure said parallel port terminals individually as input terminals or output terminals, to write to said output terminals, to read from said input terminals, and to convey data read from said input terminals to said computer, in response to commands received by said controller means by way of said adapter serial port means and said serial port connector from said computer;

(d) said controller means being programmed to translate ASCII coded commands and control data received by way of said adapter serial port means to machine language commands and control data to configure said parallel port terminals and to write said control data to selected ones of said output terminals;

(e) said controller means being programmed to translate machine language data read from input terminals to ASCII coded process data and to transfer said process data to said personal computer by way of said adapter serial port means; and (f) said adapter being configured for being positioned and operated external to said computer.

2. An adapter as set forth in claim 1 wherein said parallel port means includes:

(a) a plurality of parallel ports, each parallel port including a plurality of said parallel port terminals which can be individually configured as input terminals or output terminals; and (b) said controller means being adapted to respectively read from or write to said parallel port terminals of a parallel port simultaneously.

3. An adapter as set forth in claim 1 and including:

(a) pulse width modulator means coupled to said controller means, said pulse width modulator means being controllable by said controller means to output a pulse train of selected frequency and duty cycle in response to commands received from said computer by way of said adapter serial port means.

4. An adapter as set forth in claim 1 and including:

(a) synchronous serial interface means coupled to said controller means and enabling interfacing said computer to a synchronous serial device.

5. An adapter as set forth in claim 1 wherein said computer includes host modem means coupling said serial port to a telephone system, and including:

(a) adapter modem means coupling said serial port means to said telephone system to enable communication of said commands over said telephone system.

6. An adapter as set forth in claim 1 and including:

(a) means for measuring the resistance-capacitance (RC) time constant of an RC circuit including an interconnected resistor and capacitor coupled to one of said parallel port terminals by measuring the time to charge said capacitor through said resistor to determine the relative resistance of said resistor if the capacitance of said capacitor is known and to determine the relative capacitance of said capacitor if the resistance of said resistor is known.

7. An adapter as set forth in claim 1 wherein:

(a) said controller means includes a microcontroller unit.

8. An external parallel interface adapter for external connection to an existing serial port of a personal computer, said computer including host modem means coupling a host serial port thereof to a telephone system, and said adapter comprising:

(a) microcontroller means including adapter serial port means including adapter serial port terminals to enable interfacing to an externally accessible host serial port connector of an existing host serial port of said computer, parallel port means including a plurality of parallel port terminals which can be individually configured as input terminals or output terminals, and central processor unit (CPU) means interfaced between said adapter serial port means and said parallel port means;

(b) said CPU means being programmed to translate ASCII coded commands received from said computer by way of said adapter serial port means to machine language commands within said CPU means to thereby configure said parallel port terminals individually as input terminals or output terminals, to write to said output terminals, to read from said input terminals, and to convey process data read from said input terminals as ASCII coded process data to said computer by way of said adapter serial port means;

(c) said parallel port means including:

(1) a plurality of parallel ports, each parallel port including a plurality of said parallel port terminals which can be individually configured as input terminals or output terminals; and (2) said microcontroller means being adapted for said CPU means to respectively read from or write to said parallel port terminals of a parallel port simultaneously;

(d) pulse width modulator means coupled to said microcontroller means, said pulse width modulator being controllable by said CPU means to output a pulse train of selected frequency and duty cycle in response to commands received from said computer by way of said adapter serial port means;

(e) synchronous serial interface means coupled to said CPU means and enabling interfacing said computer to a synchronous serial device;

(f) adapter modem means coupling said adapter serial port means to said telephone system to enable communication between said computer and said microcontroller means over said telephone system;

(g) means for measuring a resistance-capacitance (RC) time constant of an RC circuit including an interconnected resistor and capacitor coupled to one of said parallel port terminals by measuring the time to charge said capacitor through said resistor to determine the relative resistance of said resistor if the capacitance of said capacitor is known and to determine the relative capacitance of said capacitor if the resistance of said resistor is known; and (h) said adapter being configured for being positioned and operated external to said computer.

* * * * *